(12) United States Patent
Tsuchino et al.

(10) Patent No.: US 8,323,763 B2
(45) Date of Patent: Dec. 4, 2012

(54) INFORMATION RECORDING MEDIUM AND METHOD FOR PRODUCING THE SAME

(75) Inventors: Akio Tsuchino, Osaka (JP); Takashi Nishihara, Osaka (JP); Rie Kojima, Osaka (JP); Noboru Yamada, Osaka (JP)

(73) Assignee: Panasonic Corporation, Osaka (JP)

( * ) Notice: Subject to any disclaimer, the term of this patent is extended or adjusted under 35 U.S.C. 154(b) by 178 days.

(21) Appl. No.: 13/057,899

(22) PCT Filed: Jul. 26, 2010

(86) PCT No.: PCT/JP2010/004749
§ 371 (c)(1),
(2), (4) Date: Feb. 7, 2011

(87) PCT Pub. No.: WO2011/024381
PCT Pub. Date: Mar. 3, 2011

(65) Prior Publication Data
US 2011/0177280 A1 Jul. 21, 2011

(30) Foreign Application Priority Data
Aug. 31, 2009 (JP) .................................. 2009-201006

(51) Int. Cl.
*B32B 3/02* (2006.01)
(52) U.S. Cl. ..................... 428/64.1; 428/64.4; 428/64.5; 428/64.6; 430/270.13
(58) Field of Classification Search ................ 428/64.4, 428/64.5; 430/270.13
See application file for complete search history.

(56) References Cited

U.S. PATENT DOCUMENTS

| | | | |
|---|---|---|---|
| 4,847,132 | A | 7/1989 | Takao et al. |
| 4,916,048 | A | 4/1990 | Yamada et al. |
| 4,935,336 | A | 6/1990 | Yamada et al. |
| 5,278,011 | A | 1/1994 | Yamada et al. |
| 5,453,346 | A | 9/1995 | Kawahara et al. |
| 6,268,107 | B1 | 7/2001 | Yamada et al. |
| 6,528,442 | B1 | 3/2003 | Kuwano et al. |
| 6,858,278 | B2 | 2/2005 | Kojima et al. |
| 2007/0190283 | A1 | 8/2007 | Imai et al. |
| 2009/0022932 | A1 | 1/2009 | Fujii et al. |
| 2009/0086608 | A1 | 4/2009 | Takaoka et al. |

FOREIGN PATENT DOCUMENTS

| | | |
|---|---|---|
| JP | 62-289937 | 12/1987 |
| JP | 63-225934 | 9/1988 |
| JP | 63-225935 | 9/1988 |
| JP | 63-259855 | 10/1988 |
| JP | 1-303643 | 12/1989 |
| JP | 6-282876 | 10/1994 |
| JP | 7-025209 | 3/1995 |

(Continued)

*Primary Examiner* — Elizabeth Mulvaney
(74) *Attorney, Agent, or Firm* — Hamre, Schumann, Mueller & Larson, P.C.

(57) ABSTRACT

The information recording medium (1) of the present invention includes a recording film (114, 124). The information recording medium (1) allows information to be recorded and reproduced on and from the information recording medium by irradiation of the recording film (114, 124) with a laser beam (18). The information recording medium (1) of the present invention further includes a mixed dielectric film (the second dielectric film 116, 126) disposed on the laser beam (18) incident side with respect to the recording film (114, 124). The mixed dielectric film contains a mixed dielectric material consisting of Zn sulfide, Si oxide and an oxide X (where the oxide X is an oxide of at least one element selected from Ti, Nb, Ta and Ce).

17 Claims, 3 Drawing Sheets

FOREIGN PATENT DOCUMENTS

| | | |
|---|---|---|
| JP | 10-016393 | 1/1998 |
| JP | 11-322413 | 11/1999 |
| JP | 2002-092950 | 3/2002 |
| JP | 2003-323743 | 11/2003 |
| JP | 2006-147131 | 6/2006 |
| JP | 2009-037722 | 2/2009 |
| WO | 2007/119439 | 10/2007 |

INFORMATION RECORDING MEDIUM AND METHOD FOR PRODUCING THE SAME

TECHNICAL FIELD

The present invention relates to an information recording medium on and from which information is recorded and reproduced by an optical means, and a method for producing the same.

BACKGROUND ART

As an example of an optical information recording medium, there can be mentioned a phase-change information recording medium with respect to which information can be recorded, erased, and rewritten by an optical means using a laser beam. Blu-ray Disc media, for example, are now commercially available as a phase-change information recording medium. Single-side, dual-layer BD-RE (Blu-ray Disc Rewritable) media (with a recording capacity of 50 GB and a transfer rate of 36 Mbps (1× speed)) are commercially available as a high-capacity medium that can be used for high-definition digital broadcasting.

Such single-side, dual-layer BD-RE media have two information layers, in which a fully reflective information layer L0 located farther from the laser beam incident side and a semi-transmissive information layer L1 located on the laser beam incident side are provided with an optical separation layer interposed therebetween. As an example of the configuration of the semi-transmissive information layer L1, there can be mentioned a configuration in which a transmittance adjusting film, a reflective film, a first dielectric film, a first interface film, a recording film, a second interface film and a second dielectric film are formed in this order on a surface of the optical separation layer.

For the recording film, a phase change material capable of causing a reversible change between the crystalline phase and the amorphous phase is used. Examples thereof include a material having a composition on a line extending between $Ge_{50}Te_{50}$ and $Sb_{40}Te_{60}$ (see Patent Literature 1), a material having a composition on a line extending between $Ge_{50}Te_{50}$ and $Bi_{40}Te_{60}$ (see Patent Literature 2) obtained by substituting Sb with Bi in the above-mentioned material, and a material that contains Sb as its main component (about 70 atom %) and has a composition in the vicinity of an eutectic point of SbTe as a base (see Patent Literature 3). Generally, information is recorded as follows: the recording film is heated to a temperature higher than its melting point by irradiation with a laser beam at high power (recording power), so that the irradiated region is melted, followed by rapid cooling, thereby forming an amorphous phase. In contrast, information is erased as follows: the recording film is heated to a temperature higher than its crystallization temperature but lower than its melting point by irradiation with a laser beam at lower power (erasing power) than in recording, so that the temperature of the recording film is increased, followed by gradual cooling, thereby forming a crystalline phase. A reflectance difference occurs between the crystalline region and amorphous region thus formed, which enables information to be reproduced. The larger the reflectance difference and the reflectance ratio between the crystalline region and the amorphous region, the higher the quality of reproduced signals to be obtained.

The first dielectric film and the second dielectric film have functions of enhancing the optical absorption efficiency of the recording film by adjusting the optical distance (=refractive index×physical distance), increasing the difference between the reflectance in the crystalline phase and the reflectance in the amorphous phase, and increasing the signal amplitude. Further, they also have a function of protecting the recording film from moisture, etc. Examples of the material for these dielectric films include a mixture of 80 mol % ZnS and 20 mol % $SiO_2$ (hereinafter, expressed as $(ZnS)_{80}\ (SiO_2)_{20}$(for example, see Patent Literature 4 and Patent Literature 5). This material is an amorphous material and has low thermal conductivity, high refractive index, and high transparency as its properties. Further, it has a high deposition rate in film formation and has excellent mechanical properties and moisture resistance as well. Because of such excellent properties, $(ZnS)_{80}\ (SiO_2)_{20}$ has been put to practical use as a material that is very suitable for forming a dielectric film.

The transmittance adjusting film has a function of adjusting the transmittance. Use of a material with a high refractive index n (preferably n≧2.5) for this film enhances the transmittance of the information layer. Further, it allows the transmittance of the information layer when the recording film is in the crystalline phase and the transmittance of the information layer when the recording film is in the amorphous phase to approximate each other.

The first interface film and the second interface film are provided to prevent the elements that constitute the first dielectric film and the second dielectric film from diffusing into the recording film when rewrite-recording is performed repeatedly, and to prevent the rewriting properties of the recording film from being changed. As a material for the interface films, there has been disclosed a material containing $ZrO_2$ and $Cr_2O_3$, for example (see Patent Literature 6). This material is excellent because it has high transparency with respect to a laser in the blue-violet wavelength region (near 405 nm) and also has high heat resistance due to its high melting point.

Optically, the reflective film has a function of increasing the amount of light to be absorbed by the recording film. Thermally, the reflective film has a function of rapidly diffusing heat generated in the recording film and rapidly cooling the recording film so as to make it easy for the recording film to be amorphous. Furthermore, the reflective film also has a function of protecting the recording film, the interface films, and the dielectric films from the use environment. Therefore, Ag alloys with high thermal conductivity have been preferably used as a material for the reflective film.

In the future, it will be necessary to increase the capacity per disc in response to a further increase in volume of recording contents, widespread use for personal computers, resource savings in view of environment, and space savings.

The capacity per disc can be increased, for example, by further increasing the number of information layers to be stacked (multi-layering), or further increasing the recording capacity per information layer (recording density increase).

For achieving multi-layering of information layers, it is necessary to increase the transmittance of semi-transmissive information layers located nearer to the laser beam incident side so that information (with high S/N ratio) can be correctly read out also from the information layer located farther therefrom. In order to enhance the transmittance of the information layers, it is necessary to design the recording film and the reflective film, which have high absorptivity of laser beams, to be thin in the aforementioned configuration. However, if the thickness of the recording film and the reflective film is reduced while the reflectance of each information layer is maintained, the reflectance ratio decreases, resulting in deterioration of the signal quality or degradation of the rewriting performance. Accordingly, there is a limit in reducing the thickness of the recording film and reflective film. Therefore, in a multilayered information recording medium, as the number of information layers to be stacked increases, the reflectance of the information layer is set to be lower and the power of the reproducing beam is increased more at the same time so that signals with high S/N ratio can be recorded/reproduced.

For increasing the recording capacity per information layer (in-plane), it also is conceivable to increase the recording (mark/space) density, leading to an increase in the recording capacity per information layer, for example, from 25 GB to 30 GB or 33.4 GB. The increase in the recording density causes the interval of a recording mark (amorphous region) and a space (crystalline region) to be reduced. Thus, the material composition of each layer and the configuration of the information recording medium are required to be made suitable for high density recording.

CITATION LIST

Patent Literature
Patent Literature 1: JP 63(1988)-225934 A
Patent Literature 2: JP 63(1988)-225935 A
Patent Literature 3: JP 1(1989)-303643 A
Patent Literature 4: JP 62(1987)-289937 A
Patent Literature 5: JP 63(1988)-259855 A
Patent Literature 6: JP 2003-323743 A

SUMMARY OF INVENTION

Technical Problem

The inventors focused attention on the process of dissipating heat from the recording film in the phase-change information recording medium and found a problem in conventional configurations.

In the multilayered information recording medium, as the number of information layers increases with multi-layering, the power of the reproducing beam also needs to be increased, as described above. The increase in the power of the reproducing beam causes an increase in heat load on the recording film, and thus the amorphous recording marks are crystallized due to the heat. As a result, the signal quality is deteriorated. This phenomenon is rendered more significant during the reproduction cycle (when the same track is repeatedly reproduced). In order to solve this problem, it is necessary to improve the efficiency of dissipating heat from the recording film. However, the reflective film also has a reduced thickness in a semi-transmissive information layer for improving the transmittance, as mentioned above, and therefore it is difficult to improve the efficiency of dissipating heat from the recording film to the side of the reflective film. As a result, the efficiency of dissipating heat rather decreases.

In addition, the increase in recording density also causes an increase in the influence of mutual thermal interference because the interval of mark/space is reduced. Therefore, the heat dissipation efficiency needs to be further enhanced.

The inventors arrived at a solution to the above-mentioned problem in which the heat stored in the recording film is rapidly dissipated by enhancing the heat dissipation efficiency of the second dielectric film that is disposed on the laser beam incident side with respect to the recording film. Specifically, they conceived an idea of using a dielectric material that has higher thermal conductivity than $(ZnS)_{80}(SiO_2)_{20}$ for the second dielectric film.

Since $ZnS$—$SiO_2$ has low thermal conductivity, the thermal conductivity of the second dielectric film can be enhanced by replacing it with a dielectric material that has higher thermal conductivity. However, the second dielectric film is required to have a function of enhancing the signal amplitude by adjusting the optical distance, and therefore is required to have high transparency and an appropriate refractive index. For this reason, a dielectric material that satisfies the optical properties is needed.

It is therefore an object of the present invention to provide an information recording medium having excellent durability against the reproducing beam (hereinafter, referred to as reproduction durability), and good signal quality and repeated rewriting properties by obtaining a material that has higher thermal conductivity than materials conventionally used for the second dielectric film and the optical properties (high transparency and an appropriate refractive index) equivalent to those of the conventional materials at the same time. It is a further object of the present invention to provide a method for producing such an information recording medium.

Solution to Problem

In order to accomplish the above-mentioned objects, the information recording medium of the present invention includes a recording film. The information recording medium allows information to be recorded and reproduced on and from the information recording medium by irradiation of the recording film with a laser beam. The information recording medium further includes a mixed dielectric film disposed on the laser beam incident side with respect to the recording film. The mixed dielectric film contains a mixed dielectric material consisting of Zn sulfide, Si oxide and an oxide X (where the oxide X is the oxide of at least one element selected from Ti, Nb, Ta and Ce).

Further, the first method for producing an information recording medium of the present invention includes the step of forming a mixed dielectric film containing a mixed dielectric material consisting of Zn sulfide, Si oxide and an oxide X (where the oxide X is the oxide of at least one element selected from Ti, Nb, Ta and Ce). In the step, the mixed dielectric film is formed by sputtering using a sputtering target that contains ZnS, $SiO_2$ and D (where D is at least one selected from $TiO_2$, $Nb_2O_5$, $Ta_2O_5$ and $CeO_2$).

Furthermore, the second method for producing an information recording medium of the present invention includes the step of forming a mixed dielectric film containing a mixed dielectric material consisting of Zn sulfide, Si oxide and an oxide X (where the oxide X is the oxide of at least one element selected from Ti, Nb, Ta and Ce). In the step, the mixed dielectric film is formed by simultaneous sputtering of a first sputtering target and a second sputtering target using at least two cathodes. The first sputtering target is made of ZnS and $SiO_2$, and the second sputtering target is made of D (where D is at least one selected from $TiO_2$, $Nb_2O_5$, $Ta_2O_5$ and $CeO_2$).

Advantageous Effects of Invention

In the present invention, the mixed dielectric material to be used for the mixed dielectric film that is disposed on the laser beam incident side to the recording film has higher thermal conductivity than $(ZnS)_{80}(SiO_2)_{20}$ that has been generally used for a film corresponding to the mixed dielectric film (the second dielectric film) in conventional information recording media. The mixed dielectric film containing such a mixed dielectric material allows the heat stored in the recording film during reproduction cycle to be rapidly diffused, and can prevent application of heat load on the recording film. This allows an effect of improving reproduction durability to be obtained, according to the present invention. Furthermore, such high heat dissipation effect enables the stability of recording marks (amorphous region) to be enhanced, thus allowing high storage stability of signals to be obtained. Moreover, this mixed dielectric film has high transparency, and therefore high signal quality and repeated rewriting properties can be obtained.

With the method for producing the information recording medium of the present invention, it is possible to produce an information recording medium having the above-mentioned effects.

DESCRIPTION OF EMBODIMENTS

Figure 1:
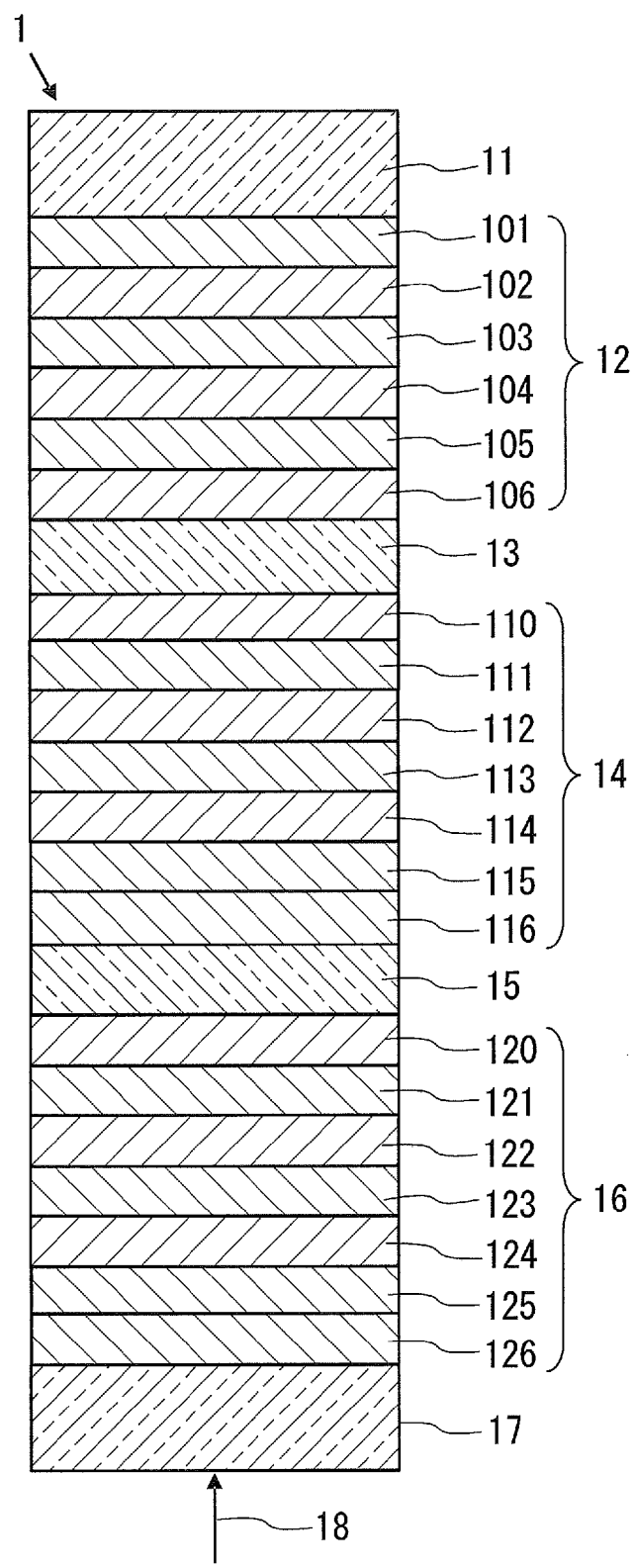
FIG. 1 is a partial cross-sectional view of an information recording medium according to Embodiment 1 of the present invention.

The information recording medium of the present invention includes a recording film. The information recording medium allows information to be recorded and reproduced on the information recording medium by irradiation of the recording film with a laser beam. The information recording medium of the present invention further includes a mixed dielectric film disposed on the laser beam incident side with respect to the recording layer. The mixed dielectric film includes a mixed dielectric material consisting of Zn sulfide, Si oxide and an oxide X. The "oxide X" herein means the oxide of an at least one element selected from Ti, Nb, Ta and Ce, and this expression is hereinafter used with the same meaning in this description.

The mixed dielectric film in the present invention may contain a component other than the mixed dielectric material as long as the effects of the present invention are not impaired. It is preferable that the mixed dielectric film in the present invention consists essentially of the mixed dielectric material in order to stably obtain sufficient effects. In this case, the mixed dielectric film desirably contains 95 mol % or more of the mixed dielectric material. Even if a slight amount (about 2 mol % or less) of impurity is contained in the mixed dielectric film, there is no problem as long as it does not have influence on the effects. The mixed dielectric film may be formed only of the mixed dielectric material.

When the mixed dielectric film contains 30 mol % or less of the oxide X, the transparency of the mixed dielectric film can be enhanced more, and the signal quality can be improved more.

Further, when the mole ratio of the Si oxide with respect to the total of the Zn sulfide and the Si oxide in the mixed dielectric film is set to 0.3 or less, the reduction of the refractive index of the mixed dielectric film can be suppressed, so that the signal quality can be improved more.

When the oxide X is at least one selected from a Ti oxide and an Nb oxide, the thermal conductivity of the mixed dielectric film can be enhanced more, and the reproduction durability and the signal storage stability can be improved further.

The mixed dielectric material may be a material expressed by the formula: $\{(ZnS)_{1-y}(SiO_2)_y\}_{100-x}(D)_x$ (mol %). It should be noted that x and y respectively satisfy $0<x<100$, and $0<y<1$, and D is at least one selected from $TiO_2$, $Nb_2O_5$, $Ta_2O_5$ and $CeO_2$, in the formula. This can enhance the transparency of the mixed dielectric film more and improve the amorphous properties of the mixed dielectric film as well, thereby improving the signal quality and the repeated rewriting performance more. Furthermore, when x and y respectively satisfy $0<x\leq30$, $0<y\leq0.3$ in the formula, the transparency of the mixed dielectric film can be enhanced furthermore, so that the signal quality can be improved. It should be noted that "$\{(ZnS)_{1-y}(SiO_2)_y\}_{100-x}(D)_x$ (mol %)" means to be a mixture of (100-x) mol % of "$(ZnS)_{1-y}(SiO_2)_y$," and x mol % of the oxide "D" in this description. In addition, "D" denotes at least one selected from $TiO_2$, $Nb_2O_5$, $Ta_2O_5$ and $CeO_2$, and this expression is hereinafter used with the same meaning in this description.

When the above-mentioned D is at least one selected from $TiO_2$ and $Nb_2O_5$, the thermal conductivity of the mixed dielectric film can be enhanced more, and the reproduction durability and the signal storage stability can be improved more.

Further, when the mixed dielectric film has a refractive index of at least 2.15 nm and an extinction coefficient of 0.04 or less at a wavelength of 400 nm to 410, the reflectance ratio is improved, which therefore is preferable.

Further, an interface film may be further provided between the recording film and the mixed dielectric film. Such an interface film prevents the elements in the mixed dielectric film from being diffused into the recording film, thus suppressing the reduction of the recording properties.

The mixed dielectric film having a thickness of at least 25 nm but not more than 100 nm allows the signal quality to be improved more.

The structure of the present invention can be applied to a multilayered information recording medium provided with a plurality of information layers. Specifically, layers from a first information layer to an N-th information layer (where N is an integer of at least two) are disposed in order from the opposite side of the laser beam incident side, and at least one information layer included in the layers from the first information layer to the N-th information layer should include the mixed dielectric film and the recording film in this order from the laser beam incident side. In this way, when the structure of the present invention is applied to a multilayered information recording medium, higher effects of the present invention can be achieved. Furthermore, provided that an n-th information layer included in the layers from the first information layer to the N-th information layer includes the mixed dielectric film and the recording film in this order from the laser beam incident side, when n is an integer that satisfies $1<n\leq N$, still higher effects of the present invention can be obtained.

Next, the first and the second methods each for producing an information recording medium of the present invention are described.

In the first and the second production methods of the present invention, a mixed dielectric film is formed by sputtering. Use of sputtering allows a dielectric thin film having the same composition as a sputtering target to be formed.

The first production method of the present invention is a method including the step of forming a mixed dielectric film that contains a mixed dielectric material consisting of Zn sulfide, Si oxide and the oxide X. In the step, the mixed dielectric film is formed by sputtering using a sputtering target that contains ZnS, $SiO_2$ and D. The sputtering target may contain a component other than ZnS, $SiO_2$ and D, corresponding to the composition of the mixed dielectric film to be formed. Other component to be contained in the sputtering target and the content thereof are as described above for other component to be contained in the mixed dielectric film.

Further, it is preferable that the mixed dielectric film formed using the sputtering target contain 30 mol % or less of the aforementioned D in the first production method.

In addition, it is preferable that the mole ratio of $SiO_2$ with respect to the total of ZnS and $SiO_2$ in the mixed dielectric film that has been formed using the sputtering target be not more than 0.3 in the first production method.

On the other hand, the second production method of the present invention includes the step of forming a mixed dielectric film that contains a mixed dielectric material consisting of Zn sulfide, Si oxide and the oxide X. In the step, the mixed dielectric film is formed by simultaneous sputtering of a first sputtering target and a second sputtering target using at least two cathodes. The first sputtering target is made of ZnS and $SiO_2$ and the second sputtering target is made of D. At this time, the first sputtering target preferably contains 40 mol % or less of $SiO_2$.

Hereinafter, the embodiments of the present invention are described with reference to the drawings. The following embodiments are examples and the present invention is not limited to these.

Embodiment 1

As Embodiment 1 of the present invention, an example of an information recording medium (optical information recording medium) on and from which information is recorded and reproduced using a laser beam is described. FIG. 1 shows a partial section of the optical information recording medium. An information recording medium 1 of this embodiment includes three information layers for recording/reproduction of information. It is a multilayered optical information recording medium in which information can be recorded on and reproduced from each information layer by irradiation with the energy beam (generally, the laser beam) 18 from one side. The information recording medium 1 has a first information layer 12, a second information layer 14 and a third information layer 16 that are sequentially stacked on a substrate 11 with optical separation layers 13, 15, etc. respectively provided therebetween, and further has a cover layer 17 provided in contact with the third information layer 16. The first information layer 12 is a fully reflective information layer, and the second information layer 14 and the third information layer 16 are semi-transmissive information layers.

The substrate 11 is a disc-shaped transparent substrate. Glass or a resin, such as polycarbonate, amorphous polyolefin, and polymethylmethacrylate (PMMA), can be used as a material for the substrate 11. A guide groove (with a track pitch of 0.32 µm) for guiding the laser beam may be formed on the surface of the substrate 11 on the side of the first information layer 12, as needed. It is preferable that the surface of the substrate 11 on the opposite side of the first information layer 12 be smooth. The thickness of the substrate 11 is about 500 µm to 1300 µm, more preferably in the range of 1050 µm to 1150 µm.

The cover layer 17 is composed, for example, of a dielectric or a resin such as a photocurable resin (particularly, an ultraviolet curable resin) and a slow-acting thermosetting resin, and preferably has low optical absorption with respect to the laser beam to be used. As the cover layer 17, glass or a resin, such as polycarbonate, amorphous polyolefin, and PMMA, may be used. When such a material is used, the cover layer 17 is formed by laminating the material with the second dielectric layer 126 of the third information layer 16 using a resin such as a photocurable resin (particularly, an ultraviolet curable resin) and a slow-acting thermosetting resin. The thickness of the cover layer 17 is preferably about 40 µm to 80 µm, which allows good recording/reproduction to be performed when NA (Numerical Aperture) is 0.85, more preferably about 50 µm to 65 µm.

The optical separation layers 13 and 15 each are composed, for example, of a dielectric or a resin such as a photocurable resin (particularly, an ultraviolet curable resin) and a slow-acting thermosetting resin, and preferably have low optical absorption with respect to the laser beam to be used. The optical separation layers 13 and 15 are provided for separating the focal positions on the first information layer 12, the second information layer 14 and the third information layer 16. The thickness thereof is required to be at least the focal depth $\Delta Z$ that is determined by the numerical aperture (NA) of the objective lens and the wavelength $\lambda$ of the laser beam. Assuming that the reference of the optical intensity at a focal point is 80% of the aberration-free optical intensity, $\Delta Z$ can be approximated by $\Delta Z = \lambda / \{2(NA)^2\}$. Further, the optical separation layer 13 and the optical separation layer 15 preferably have a different thickness from each other in order to prevent the influence of a back focal point in the second information layer 14. The optical separation layers 13 and 15 may have a guide groove formed on their surface on the laser beam incident side.

Next, the configuration of the first information layer 12 is described. The first information layer 12 is formed by stacking a reflective film 101, a first dielectric film 102, a first interface film 103, a recording film 104, a second interface film 105, and a second dielectric film 106 in this order on the surface of the substrate 11.

The reflective film 101 has an optical function of increasing the amount of light to be absorbed by the recording film 104. Furthermore, the reflective film 101 also has a thermal function of rapidly diffusing heat generated in the recording film 104 and facilitating amorphization of the recording film 104. Moreover, the reflective film 101 also has a function of protecting the multilayer films from the use environment.

Examples of the material to be used for the reflective film 101 include a single metal that has high thermal conductivity, such as Ag, Au, Cu, Al, Pt, Ti, and W. Furthermore, it also is possible to use: an Al alloy obtained by adding, for example, Cr, Ni, or Ti to Al; an Au alloy obtained by adding, for example, Cu, Cr, or Nd to Au; an Ag alloy obtained by adding, for example, Cu, Pd, Ga, In, or Nd to Ag; an Ag alloy obtained by adding, for example, Pd, Ti, Ru, Al, Au, Ni, Nd, Ga, Ca, In, Gd, or Y to Ag—Cu; an Ag alloy obtained by adding, for example, Au or Pd to Ag—Nd; an Ag alloy obtained by adding, for example, Sn or Ga to Ag—In; or an alloy, such as Ag—Ga—Sn, Ag—Ga—Y, Ag—Ga—Al, Ag—Zn—Al, and Cu—Si. Particularly, Ag alloys are preferable as a material for the reflective film 101 because they have high thermal conductivity. The concentration of such an element to be added is preferably not more than 3 wt %. The thickness of the reflective film 101 is preferably at least 30 nm, which allows sufficient heat diffusion function to be obtained. However, even in such a case, when the reflective film 101 has a thickness over 240 nm, its heat diffusion function becomes too strong, and the recording sensitivity might be lowered. Thus, the thickness of the reflective film 101 more preferably falls within the range of 30 nm to 240 nm.

The first dielectric film 102 has a function of adjusting the optical distance to increase the optical absorptance of the recording film 104, and a function of increasing the change ratio in the amount of reflected light between before and after recording to increase the signal amplitude. The first dielectric film 102 also has a function of rapidly diffusing heat generated in the recording film 104 into the reflective film 101 to cool the recording film 104. When this heat diffusion is highly effective, the heat load on the recording film 104 is reduced, thus allowing good repeated rewriting properties to be obtained. Examples of the material to be used for the first dielectric film 102 include: oxides such as $SiO_2$, $ZrO_2$, $ZrSiO_4$, $HfO_2$, ZnO, $Cr_2O_3$, $In_2O_3$, $Ga_2O_3$, $Al_2O_3$, $TiO_2$, $Nb_2O_5$, $Y_2O_3$, $Bi_2O_3$, $CeO_2$ and $Dy_2O_3$; nitrides such as CN, TiN, ZrN, $Si_3N_4$, GeN, AlN, Ge—Si—N and Ge—Cr—N; carbides such as SiC; sulfides such as ZnS; and fluorides such as $LaF_3$, $CeF_3$ and $YF_3$. In addition, a mixture selected from them can be used. Specific examples thereof include $ZrO_2$—$Y_2O_3$ (stabilized zirconia or partially-stabilized zirconia), $ZrO_2$—$Cr_2O_3$, $ZrO_2$—$SiO_2$—$Cr_2O_3$, $ZrO_2$—$Y_2O_3$—$Cr_2O_3$, $ZrSiO_4$—$Cr_2O_3$, $ZrO_2$—$SiO_2$—ZnO, $ZrO_2$—$In_2O_3$, $ZrO_2$—$SiO_2$—$In_2O_3$, $ZrO_2$—$Y_2O_3$—$In_2O_3$, $ZrO_2$—$SiO_2$—$In_2O_3$—$Cr_2O_3$, $HfO_2$—$Cr_2O_3$, $HfO_2$—$SiO_2$—$Cr_2O_3$, $ZrO_2$—$Ga_2O_3$, $ZrO_2$—$SiO_2$—$Ga_2O_3$, $ZrO_2$—$SiO_2$—$Ga_2O_3$—$Cr_2O_3$, $ZrO_2$—$Al_2O_3$, $ZrO_2$—$TiO_2$, $SiO_2$—$TiO_2$, $TiO_2$—$Nb_2O_5$, $ZrO_2$—$Nb_2O_5$, $ZrO_2$—$SiO_2$—$Al_2O_3$, $ZrO_2$—$Dy_2O_3$, $ZrO_2$—$SiO_2$—$Dy_2O_3$, $In_2O_3$—$Dy_2O_3$, $Bi_2O_3$—$SiO_2$, $TiO_2$—$CeO_2$, $ZrO_2$—AlN, $Al_2O_3$—AlN, $ZrO_2$—$Cr_2O_3$—SiC, $ZrO_2$—$SiO_2$—ZnS, $SiO_2$—ZnS, $ZrO_2$—$SiO_2$—$LaF_3$, $ZrO_2$—$SiO_2$—$Cr_2O_3$—$LaF_3$, $ZrO_2$—$CeF_3$, $ZrO_2$—$SiO_2$—$CeF_3$, $ZrO_2$—$SiO_2$—$Cr_2O_3$—$CeF_3$, $Dy_2O_3$—$CeF_3$ and $ZrO_2$—$Dy_2O_3$—$CeF_3$. The thickness of the first dielectric film 102 is preferably 2 nm to 50 nm, more preferably 3 nm to 40 nm in order to further increase the change ratio in the amount of reflected light.

The first interface film 103 and the second interface film 105 function as a barrier for preventing the element diffusion from the first dielectric film 102 and the second dielectric film 106 into the recording film 104 and preventing the entry of moisture from the outside. The occurrence of element diffusion from the dielectric films deteriorates the rewriting properties due to a decrease in crystallization rate of the recording film 104, or degrades the signal storage stability due to a decrease in crystallization temperature. For example, use of a dielectric material containing ZnS such as ZnS—$SiO_2$ for the first dielectric film 106 causes S elements to be diffused into the recording film 104 during recording and the crystallization rate is reduced, resulting in a deterioration in the rewritable properties.

Since the first interface film 103 and the second interface film 105 are provided in contact with the recording film 104, they also have a function of accelerating or suppressing the crystallization rate of the recording film 104. Moreover, it is desired that the first dielectric film 103 and the second interface film 105 each have excellent adhesion to the recording film 104. It is preferable that a material with low optical absorption be used for these interface films. Examples of the material to be used for the first interface film 103 and the second interface film 105 include: oxides such as $SiO_2$, $ZrO_2$, $ZrSiO_4$, $HfO_2$, ZnO, $Cr_2O_3$, $In_2O_3$, $Ga_2O_3$, $Al_2O_3$, $TiO_2$, $Nb_2O_5$, $Y_2O_3$, $Bi_2O_3$, $CeO_2$ and $Dy_2O_3$; nitrides such as CN, TiN, ZrN, $Si_3N_4$, GeN, AlN, Ge—Si—N and Ge—Cr—N; carbides such as SiC; sulfides such as ZnS; and fluorides such as $LaF_3$, $CeF_3$ and $YF_3$. In addition, a mixture selected from them can be used. Above all, when the oxide of at least one element selected from Si, Zr, Hf, Bi, Cr, In, Ga, Al, Ti, Nb, Y, Zn and Dy is contained therein, the adhesion to the recording film 104 can be improved more. Specific examples thereof include $ZrO_2$—$Y_2O_3$ (stabilized zirconia or partially-stabilized zirconia), $ZrO_2$—$Cr_2O_3$, $ZrO_2$—$SiO_2$—$Cr_2O_3$, $ZrO_2$—$Y_2O_3$—$Cr_2O_3$, $ZrSiO_4$—$Cr_2O_3$, $ZrO_2$—$SiO_2$—ZnO, $ZrO_2$—$In_2O_3$, $ZrO_2$—$SiO_2$—$In_2O_3$, $ZrO_2$—$Y_2O_3$—$In_2O_3$, $ZrO_2$—$SiO_2$—$In_2O_3$—$Cr_2O_3$, $HfO_2$—$Cr_2O_3$, $HfO_2$—$SiO_2$—$Cr_2O_3$, $ZrO_2$—$Ga_2O_3$, $ZrO_2$—$SiO_2$—$Ga_2O_3$, $ZrO_2$—$SiO_2$—$Ga_2O_3$—$CR_2O_3$, $ZrO_2$—$Al_2O_3$, $ZrO_2$—$TiO_2$, $SiO_2$—$TiO_2$, $ZrO_2$—$Nb_2O_5$$ZrO_2$—$SiO_2$—$Al_2O_3$, $ZrO_2$—$Dy_2O_3$, $ZrO_2$—$SiO_2$—$Dy_2O_3$, $In_2O_3$—$Dy_2O_3$, $Bi_2O_3$—$SiO_2$, $TiO_2$—$CeO_2$, $ZrO_2$—AlN, $Al_2O_3$—AlN, $ZrO_2$—SiC, $ZrO_2$—$Cr_2O_3$—SiC, $ZrO_2$—$SiO_2$—ZnS, $SiO_2$—ZnS, $ZrO_2$—$SiO_2$—$LaF_3$, $ZrO_2$—$SiO_2$—$Cr_2O_3$—$LaF_3$, $ZrO_2$—$CeF_3$, $ZrO_2$—$SiO_2$—$CeF_3$, $ZrO_2$—$SiO_2$—$Cr_2O_3$—$CeF_3$ and $Dy_2O_3$—$CeF_3$. The thickness of the first interface film 103 and the second interface film 105 is preferably 1 nm to 12 nm. When the interface films are excessively thin, sufficient barrier effects cannot be obtained, which causes the element diffusion and entry of moisture into the recording film 104, resulting in deterioration of the signal quality. Meanwhile, when the interface films are excessively thick, the effect of accelerating or suppressing the crystallization of the recording film 104 increases excessively, resulting in a decrease in the recording/reproducing properties. Therefore, the thickness thereof is more preferably 2 nm to 10 nm.

The recording film 104, for example, is made of a material that reversibly changes its phase between the crystalline phase and the amorphous phase due to irradiation with the laser beam. Examples of the material to be used include a material expressed by the formula: $Ge_aM1_bM2_cTe_{100-(a+b+c)}$ (atom %). In this description, "$Ge_aM1_bM2_cTe_{100-(a+b+c)}$ (atom %)" is a composition formula that is expressed taking the total number of "Ge" atoms, "M1" atoms, "M2" atoms and "O" atoms as a reference (100%). Hereinafter, the same expression is used with the same meaning. This material allows the amorphous phase to be stable and a large amount of optical change to be achieved between the crystalline phase and the amorphous phase. M1 is at least one element selected from Sb and Bi. M2 is at least one element selected from Si, Ti, V, Fe, Co, Ni, Cu, Zr, Nb, Mo, Se, Ru, Rs, Pd, Mn, Ag, Al, Cr, Sn, Ga, In, Ta, Dy, Gd, Td, Os, Ir, W, Pt and Au. In the formula, a preferably satisfies $30 \leq a \leq 55$, more preferably $37 \leq a \leq 49$. In the formula, b preferably satisfies $0 < b \leq 20$, more preferably $0 < b \leq 12$. In the formula, c preferably satisfies $0 \leq c \leq 20$, more preferably $0 < c \leq 12$. Further, it is preferable that $35 \leq a+b+c \leq 60$ be satisfied.

As a material for the recording film 104, a material expressed by the formula: $Sb_dTe_eGe_fM3_{(100-d-e-f)}$ (atom %) also can be used, for example. M3 is at least one element selected from Au, In, Al, Ga, C, Si, Zn, Mn, Sn and Bi. Such a material allows a recording film having high crystallizability to be formed. In the formula, it is preferable that d, e, and f respectively satisfy $70 \leq d \leq 90$, $0 \leq e \leq 25$, and $32 \leq f \leq 25$.

The thickness of the recording film 104 preferably falls within the range of 5 nm to 20 nm in order to obtain good recording properties. When the recording film 104 is excessively thick, its thermal influence on the adjacent regions due to the heat diffusion in the in-plane direction increases. Meanwhile, when the recording film 104 is excessively thin, the amount of change in reflectance of the information recording medium 1 decreases. Therefore, the thickness of the recording film 104 is further preferably 7.5 nm to 13 nm.

The recording film 104 also can be formed of an irreversible phase change material. It is preferable that $TeO_x$+M4 (where M4 is an element such as Pd and Ge) be used as an irreversible phase change material, as disclosed, for example, in JP 7(1995)-25209 A (JP 2006849 B2). When the recording film 104 is formed of the irreversible phase change material, the information recording medium is of write-once type, on which information can be written only once. The present invention can be preferably applied also to such an information recording medium so as to overcome the problems of the recording sensitivity and the signal storage stability.

It should be noted that the recording film 104 is not limited to the phase change material, and a magneto-optical material in which recording, erasure and reproduction are performed by application of a magnetic field and irradiation with the optical beam also can be used therefor. Examples of the material to be used include a material that contains at least one element selected from rare earth metals consisting of Tb, Gd, Dy, Nd and Sm and at least one element selected from transition metals consisting of Sc, Cr, Fe, Co and Ni. Specifically, Tb—Fe, Te—Fe—Co, Gd—Fe, Gd—Fe—Co, Dy—Fe—Co, Nd—Fe—Co, Sm—Co, Tb—Fe—Ni, Gd—Tb—Fe—Co, and Dy—Sc—Fe—Co, for example, can be mentioned. Although the configuration of the information recording medium in the case of the recording film 104 being formed of the magneto-optical material is not necessarily identical with that shown in FIG. 1, the configuration and material of the interface films on both sides of the recording film in the present invention can be preferably applied thereto.

The second dielectric film 106 has a function of protecting the recording film 104 from moisture, etc. As does the first dielectric film 102, it also has a function of adjusting the optical distance to increase the optical absorptance of the recording film 104 and a function of increasing the change ratio in the amount of reflected light between before and after recording to increase the signal amplitude. For example, oxides such as $ZrO_2$, $HfO_2$, $SiO_2$, MgO, ZnO, $TiO_2$, $Nb_2O_2$, $Ta_2O_5$ and $Al_2O_3$; nitrides such as CN, TiN, ZrN, $Si_3N_4$, GeN, AlN, Ge—Si—N and Ge—Cr—N; sulfides such as ZnS; and carbides such as SiC can be used for the second dielectric film 106. Among these materials, a mixture of ZnS and $SiO_2$, for example, is particularly excellent as a material to be used for the second dielectric film 106 because it is an amorphous material and has a high deposition rate and refractive index, and good mechanical strength and moisture resistance. The thickness of the second dielectric film 106 can be determined by calculation based on a matrix method (see, for example, Hiroshi Kubota, "Wave Optics", Iwanami Shoten, 1971, Chapter 3) so as to satisfy the conditions that increases the optical absorptance of the recording film 104 and the change ratio in the amount of reflected light between the recording film 104 in a crystalline phase and that in an amorphous phase. Specifically, the thickness of the second dielectric film 106 desirably falls within the range of 10 nm to 150 nm, more preferably within the range of 25 nm to 80 nm. It also is possible to use the mixed dielectric material in the present invention for the second dielectric film 106.

Next, the configuration of the second information layer 14 is described. The second information layer 14 is formed by stacking a transmittance adjusting film 110, a reflective film 111, a first dielectric film 112, a first interface film 113, a recording film 114, a second interface film 115, and a second dielectric film 116 in this order on the surface of the optical separation layer 13.

The transmittance adjusting film 110 has a function of adjusting the transmittance of the second information layer 14. By providing this film, both the transmittance $T_c$ (%) of the second information layer 14 when the recording film 114 is in the crystalline phase and the transmittance $T_a$ (%) of the second information layer 14 when the recording film 114 is in the amorphous phase can be increased. Specifically, in the case of providing the transmittance adjusting film 110, $T_c$ and $T_a$ can be increased by 2 to 8%, as compared to the case without the transmittance adjusting film 110. The transmittance adjusting film 110 also has a function of rapidly diffusing heat generated in the recording film 114 into the reflective film 111 to cool the recording film 114. In order to further increase the transmittance, the refractive index n1 and the extinction coefficient k1 of the transmittance adjusting film 110 preferably satisfy $n1 \geq 2.0$ and $k1 \leq 0.1$, more preferably $n1 \geq 2.4$ and $k1 \leq 0.05$, respectively. For example, oxides such as $TiO_2$, $ZrO_2$, $HfO_2$, ZnO, $Nb_2O_5$, $Ta_2O_5$, $Al_2O_3$, $Bi_2O_3$, $Y_2O_3$ and $CeO_2$; and nitrides such as Ti—N, Zr—N, Nb—N, Ta—N, Si—N, Ge—N, Cr—N, Al—N, Ge—Si—N and Ge—Cr—N can be used for the transmittance adjusting film 110. The thickness d1 of the transmittance adjusting film 110 preferably satisfies $(1/16)\lambda/n1 \leq d1 \leq (7/32)\lambda n1$, or $(9/16)\lambda/n1 \leq d1 \leq (21/32)\lambda/n1$.

The same material as that of the above-described reflective film 101 can be applied also to the reflective film 111 and so can the function and shape. The thickness of the reflective film 111 desirably falls within the range of 4 nm to 20 nm, more preferably within the range of 7 nm to 14 nm.

The same material as that of the above-described first dielectric film 102 can be applied also to the first dielectric film 112 and so can the function and shape. The thickness of the first dielectric film 112 desirably falls within the range of 3 nm to 20 nm, more preferably within the range of 4 nm to 15 nm.

The same material as that of the above-described first interface film 103 can be applied also to the first interface film 113 and so can the function and shape. The thickness of the first interface film 113 desirably falls within the range of 3 nm to 15 nm, more preferably within the range of 3 nm to 10 nm.

The same material as that of the above-described recording film 104 can be applied also to the recording film 114 and so can the function and shape. However, in order to increase the transmittance of the laser beam, the thickness of the recording film 114 is preferably reduced as much as possible, and it more preferably falls within the range of 4 nm to 10 nm. Particularly, a material expressed by the above-mentioned formula: $Ge_aM1_bM2_cTe_{100-(a+b+c+)}$ (atom %) is preferably used therefor.

The same material as that of the above-described second interface film 105 can be applied also to the second interface film 115 and so can the function and shape. The thickness of the second interface film 115 desirably falls within the range of 2 nm to 15 nm, more preferably within the range of 3 nm to 10 nm.

The second dielectric film 116 in this embodiment is one of the features of the information recording medium of the present invention, and corresponds the mixed dielectric film in the present invention. As does the above-described second dielectric film 106, the second dielectric film 116 has a function of protecting the recording film 114 from moisture, etc., a function of adjusting the optical distance to increase the optical absorptance of the recording film 114 and a function of increasing the change ratio in the amount of reflected light between before and after recording to increase the signal amplitude. Further, use of the mixed dielectric material in the present invention enhances the heat dissipation effect toward the second dielectric film 116, and allows heat stored in the recording film 114 to be rapidly diffused.

The mixed dielectric material to be used herein contains Zn sulfide (preferably ZnS) and Si oxide (preferably $SiO_2$), and therefore high amorphous properties can be obtained. Since the oxide X that has higher thermal conductivity than ZnS is further added to the mixed dielectric material, the thermal conductivity thereof can be enhanced. The oxide X in the form of $TiO_2$, $Nb_2O_5$, $Ta_2O_5$ or $CeO_2$ is considered to be more preferable. Further, high refractive index and high transparency of the oxide X allows the second dielectric film 116 to have a refractive index of at least 2.15 and an extinction coefficient of 0.04 or less at a wavelength of 400 to 410 nm.

Specifically, examples of the system of elements that constitute the mixed dielectric film include (Zn—S)—(Si—O)—(Ti—O), (Zn—S)—(Si—O)—(Nb—O), (Zn—S)—(Si—O)—(Ta—O), (Zn—S)—(Si—O)—(Ce—O), (Zn—S)—(Si—O)—(Ti—O)—(Nb—O) and (Zn—S)—(Si—O)—(Ti—O)—(Ta—O). It should be noted that Zn sulfide is expressed as (Zn—S), Si oxide is expressed as (Si—O), Ti oxide is expressed as (Ti—O), Nb oxide is expressed as (Nb—O), Ta oxide is expressed as (Ta—O), and Ce oxide is expressed as (Ce—O), in this description.

In order to obtain better signal quality, the mixed dielectric film preferably contains 30 mol % or less of the oxide X. Further, in order to obtain better signal quality, it is preferable that the mole ratio of the Si oxide with respect to the total of the Zn sulfide and the Si oxide in the mixed dielectric film be not more than 0.3. The thickness of the second dielectric film 116 preferably falls within the range of 25 nm to 50 nm.

Next, the configuration of the third information layer 16 is described. The third information layer 16 is formed by stacking a transmittance adjusting film 120, a reflective film 121, a first dielectric film 122, a first interface film 123, a recording film 124, a second interface film 125, and a second dielectric film 126 in this order on the surface of the optical separation layer 15.

The configuration of the third information layer 16 is basically the same as that of the second information layer 14.

The same material as that of the transmittance adjusting film 110 can be applied also to the transmittance adjusting film 120 and so can the function and shape.

The same material as that of the reflective film 111 can be applied also to the reflective film 121 and so can the function and shape. However, in order to increase the transmittance, the thickness of the reflective film 121 is preferably reduced as much as possible, and it more preferably falls within the range of 5 nm to 12 nm.

The same material as that of the first dielectric film 112 can be applied also to the first dielectric film 122 and so can the function and shape.

The same material as that of the first interface film 113 shown in Embodiment 1 can be applied also to the first interface film 123 and so can the function and shape. The first interface film 123 can be provided, as needed, for example, when element diffusion from the first dielectric film 122 occurs.

The same material as that of the recording film 114 can be applied also to the recording film 124 and so can the function and shape. However, in order to increase the transmittance, the thickness thereof is preferably reduced as much as possible, and it more preferably falls within the range of 4 nm to 8 nm.

The same material as that of the second interface film 115 can be applied also to the second interface film 125 and so can the function and shape.

The mixed dielectric material in the present invention can be used for the second dielectric film 126, as used for the second dielectric film 116. The function and shape also may be the same.

In this embodiment, the mixed dielectric film in the present invention is applied to both the second dielectric film 116 of the second information layer 14 and the second dielectric film 126 of the third information layer 16. However, the information recording medium of the present invention may include at least one information layer that includes the mixed dielectric film. Therefore, in the case where the mixed dielectric film in the present invention is used for the second dielectric film 126 of the third information layer 16, there is no necessity that the second dielectric film 116 of the second information layer 14 be formed of the mixed dielectric material in the present invention. In such a chase, the material used for the second dielectric film 106 can be used also for the second dielectric film 116, for example.

The reflectance of each information layer in the state where the information recording medium 1 is completed is preferably 1.3% to 5.0%, more preferably 1.3% to 3.3%, in order to obtain good signal amplitude. In addition, in order to stabilize the focus servo (pull-in), it is more preferable that all the information layers each have about the same reflectance.

Next, a method for producing the information recording medium 1 described in this embodiment is described.

The reflective film, the first dielectric film, the first interface film, the recording film, the second interface film, the second dielectric film and the transmittance adjusting film that are included in the information recording medium 1 each can be formed by sputtering, which is one of vapor deposition methods.

First, the substrate 11 (with a thickness of 1100 μm, for example) is set in a film forming apparatus.

Subsequently, the reflective film 101 is formed first. Here, in the case where the substrate 11 is formed with a guide groove, the reflective film 101 is formed on the surface on the side of this groove. The reflective film 101 is formed by sputtering of a sputtering target made of a metal or an alloy that constitutes the reflective film 101 in an atmosphere of rare gas (examples thereof include any one of Ar gas, Kr gas, and Xe gas, among which Ar gas that is inexpensive is preferably used: this also applies to the rare gas to be described later) or an atmosphere of a mixed gas of rare gas and reactive gas (oxygen gas or nitrogen gas, for example).

Subsequently, the first dielectric film 102 is formed on the reflective film 101. The first dielectric film 102 can be formed by sputtering using a sputtering target made of a mixture that constitutes the first dielectric film 102 in an atmosphere of rare gas or in an atmosphere of a mixed gas of rare gas and reactive gas.

Subsequently, the first interface film 103 is formed on the first dielectric film 102. The first interface film 103 can be formed by sputtering using a sputtering target made of a mixture of a dielectric that constitutes the first interface film 103 in an atmosphere of rare gas or in an atmosphere of a mixed gas of rare gas and reactive gas. Alternatively, the first interface film 103 can be formed by reactive sputtering using a sputtering target containing a metal element that constitutes the first interface film 103 in an atmosphere of a mixed gas of rare gas and reactive gas, as another example.

Subsequently, the recording film 104 is formed on the first interface film 103. The recording film 104 can be formed by sputtering using a target made of Ge-M1-M2-Te alloy or Sb—Te—Ge-M3 alloy in accordance with its composition, in an atmosphere of Ar gas, in an atmosphere of Kr gas, in an atmosphere of a mixed gas of Ar and reactive gas, or in an atmosphere of a mixed gas of Kr and reactive gas.

Subsequently, the second interface film 105 is formed on the recording film 104. The second interface film 105 can be formed by sputtering using a sputtering target made of a mixture that constitutes the second interface film 105 in an atmosphere of rare gas or in an atmosphere of a mixed gas of rare gas and reactive gas. Alternatively, the second interface film 105 can be formed by reactive sputtering using a sputtering target containing a metal element that constitutes the second interface film 105 in an atmosphere of a mixed gas of rare gas and reactive gas, as another example.

Subsequently, the second dielectric film 106 is formed on the second interface film 105. The second dielectric film 106 can be formed by sputtering using a sputtering target made of a mixture that constitutes the second dielectric film 106 in an atmosphere of rare gas or in an atmosphere of a mixed gas of rare gas and reactive gas. Alternatively, the second dielectric film 106 can be formed by reactive sputtering using a sputtering target containing a metal element that constitutes the second dielectric film 106 in an atmosphere of a mixed gas of rare gas and reactive gas, as another example.

Subsequently, the optical separation layer 13 is formed on the second dielectric film 106. The optical separation layer 13 can be formed by applying a resin such as a photocurable resin (particularly, an ultraviolet curable resin) or a slow-acting thermosetting resin onto the first information layer 301, performing spin coating, and then curing the resin. In the case of providing a guide groove on the optical separation layer 13, a transfer substrate (mold) on the surface of which a groove in a specific shape is formed is brought into close contact with the resin before curing. Then, the substrate 11 and the transfer substrate are subject to spin coating, followed by curing of the resin. Thereafter, the transfer substrate is separated from the cured resin. Thus, the optical separation layer 13 formed with a specific guide groove can be formed.

Subsequently, the second information layer 14 is formed. The transmittance adjusting film 110 is formed first. The transmittance adjusting film 110 can be formed by sputtering using a sputtering target made of a dielectric that constitutes the transmittance adjusting film 110 in an atmosphere of Ar gas or in an atmosphere of a mixed gas of Ar and reactive gas. Alternatively, the transmittance adjusting film 110 can be formed by reactive sputtering using a sputtering target containing a metal element that constitutes the transmittance adjusting film 110 in an atmosphere of a mixed gas of Ar and reactive gas.

Subsequently, the reflective film 111 is formed on the transmittance adjusting film 110. The reflective film 111 can be formed in the same manner as the aforementioned reflective film 101.

Subsequently, the first dielectric film 112 is formed on the reflective film 111. The first dielectric film 112 can be formed in the same manner as the aforementioned first dielectric film 102.

Subsequently, the first interface film 113 is formed on the first dielectric film 112. The first interface film 113 can be formed in the same manner as the aforementioned first interface film 103.

Subsequently, the recording film 114 is formed on the first interface film 113. The recording film 114 can be formed in the same manner as the aforementioned recording film 104.

Subsequently, the second interface film 115 is formed on the recording film 114. The second interface film 115 can be formed in the same manner as the aforementioned second interface film 105.

Subsequently, the second dielectric film 116 is formed on the second interface film 115. The second dielectric film 116 can be formed in the same manner as the aforementioned second dielectric film 106. Alternatively, the second dielectric film 116 can be formed also by co-sputtering in which a sputtering target made of ZnS and $SiO_2$ and a sputtering target made of D are sputtered at the same time using two power sources, as another example.

Subsequently, the optical separation layer 15 is formed on the second dielectric film 116. The optical separation layer 15 can be formed in the same manner as the aforementioned optical separation layer 13.

Subsequently, the third information layer 16 is formed. The third information layer 16 can be formed basically in the same manner as the aforementioned second information layer 14.

The transmittance adjusting film 120 is formed on the optical separation layer 15 first. The transmittance adjusting film 120 can be formed in the same manner as the aforementioned transmittance adjusting film 110.

Subsequently, the reflective film 121 is formed on the transmittance adjusting film 120. The reflective film 121 can be formed in the same manner as the aforementioned reflective film 111.

Subsequently, the first dielectric film 122 is formed on the reflective film 121. The first dielectric film 122 can be formed in the same manner as the aforementioned first dielectric film 112.

Subsequently, the first interface film 123 is formed on the first dielectric film 122. The first interface film 123 can be formed in the same manner as the aforementioned first interface film 113.

Subsequently, the recording film 124 is formed on the first interface film 123. The recording film 124 can be formed in the same manner as the aforementioned recording film 114.

Subsequently, the second interface film 125 is formed on the recording film 124. The second interface film 125 can be formed in the same manner as the aforementioned second interface film 115.

Subsequently, the second dielectric film 126 is formed on the second interface film 125. The second dielectric film 126 can be formed in the same manner as the aforementioned second dielectric film 116.

The power source to be used in each of the above-mentioned sputtering processes may be a direct current (DC) power source or a radio frequency (RF) power source. The power to be supplied may be set to 1 W to 10 kW. The sputtering performed using the DC power source is referred to as DC sputtering, and the sputtering performed using the RF power source is referred to as RF sputtering.

The pressure inside the film formation chamber during sputtering may be set to 0.01 Pa to 50 Pa.

Finally, the cover layer 17 is formed on the second dielectric film 126. The cover layer 17 can be formed by applying a resin such as a photocurable resin (particularly, an ultraviolet curable resin) and a slow-acting thermosetting resin onto the second dielectric film 126, performing spin coating, and then curing the resin. For the cover layer 17, a disc-shaped substrate made of glass or a resin, such as polycarbonate, amorphous polyolefin, and PMMA, may be used. In this case, the cover layer 17 can be formed by applying a resin such as a photocurable resin (particularly, an ultraviolet curable resin) and a slow-acting thermosetting resin onto the second dielectric film 126, bringing the disc-shaped substrate into close contact therewith, spreading the resin uniformly by spin coating, and curing the resin.

Besides sputtering, vacuum vapor deposition, ion plating, chemical vapor deposition (CVD), and molecular beam epitaxy (MBE) also can be used as a film forming method of each layer.

An initialization process of crystallizing the entire surface of the recording films 104, 114 and 124 may be performed, as needed, respectively after the second dielectric films 106, 116 and 126 are formed. Alternatively, the initialization process may be performed, as needed, after the optical separation layers 13 and 15 are formed, or after the cover layer 17 is formed. This initialization process can be performed by irradiation with the laser beam. Preferably, the laser beam to be used for the initialization has a wavelength of 790 nm to 830 nm in order to shorten the time required for the initialization by increasing the beam width so that the production cost of the information recording medium can be reduced.

Embodiment 2

Figure 2:
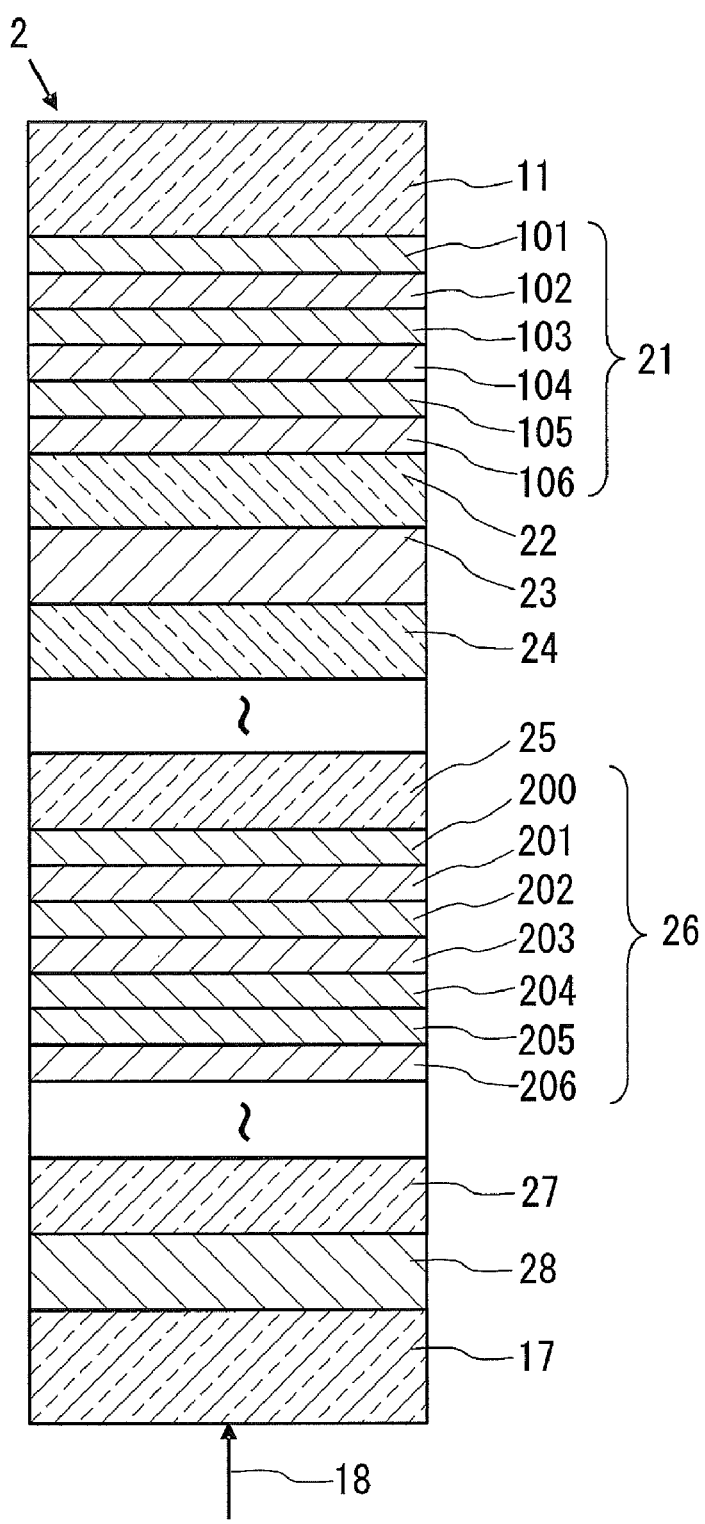
FIG. 2 is a partial cross-sectional view of an information recording medium according to Embodiment 2 of the present invention.

As Embodiment 2 of the present invention, still another example of an information recording medium (optical information recording medium) on and from which information is recorded and reproduced using a laser beam is described. FIG. 2 shows a partial section of the optical information recording medium. An information recording medium 2 of this embodiment includes N information layers (where N is an integer of two or more) for recording/reproduction of information. It is a multilayered optical information recording medium in which recording/reproduction of information is performed with respect to each information layer by irradiation with the energy beam (generally, the laser beam) 18 from one side. The information recording medium 2 has layers from a first information layer 21 to an N-th information layer 28 that are sequentially stacked with optical separation layers 22, 24, 25 and 27 respectively provided therebetween.

The substrate 11 and the cover layer 17 are identical respectively to those described in Embodiment 1 in terms of material, function and shape.

All the optical separation layers 22, 24, 25 and 27 also are identical to the optical separation layers 13 and 15 described in Embodiment 1 in terms of material, function and shape.

Next, the configuration of the first information layer 21 is described. The first information layer 21 is formed by stacking a reflective film 101, a first dielectric film 102, a first interface film 103, a recording film 104, a second interface film 105 and a second dielectric film 106 in this order on the surface of the substrate 11. The substrate 11, the reflective film 101, the first dielectric film 102, the first interface film 103, the recording film 104, the second interface film 105 and the second dielectric film 106 are identical respectively to those described in Embodiment 1 in terms of material, function and shape.

Next, the configuration of an n-th (where n is an integer that satisfies $1 < n \leq N$) information layer 26 is described. FIG. 2 shows the configuration of the n-th information layer 26. The n-th information layer 26 is formed by stacking a transmittance adjusting film 200, a reflective film 201, a first dielectric film 202, a first interface film 203, a recording film 204, a second interface film 205 and a second dielectric film 206 in this order on the surface of the optical separation layer 25.

The transmittance adjusting film 200 can be formed of the same material as that of the transmittance adjusting film 110 described in Embodiment 1 and the function and shape thereof also are the same as those of the transmittance adjust layer 110.

The reflective film 201 can be formed of the same material as that of the reflective film 111 described in Embodiment 1 and the function and shape thereof also are the same as those of the reflective film 111.

The first dielectric film 202 can be formed of the same material as that of the first dielectric film 112 described in Embodiment 1 and the function and shape thereof also are the same as those of the first dielectric film 112.

The first interface film 203 can be formed of the same material as that of the first interface film 113 described in Embodiment 1 and the function and shape thereof also are the same as those of the first interface film 113. The first interface film 203 can be provided, as needed, for example, when element diffusion from the first dielectric film 202 occurs.

The recording film 204 can be formed of the same material as that of the recording film 114 described in Embodiment 1 and the function thereof also is the same as that of the recording film 114. However, the thickness thereof is preferably reduced as much as possible in order to increase the transmittance of the laser beam. Accordingly, in the case where the recording film 204 is included in the second information layer or the third information layer, the thickness thereof is preferably 10 nm or less. In the case where the recording film 204 is included in the fourth or higher order of information layer, the thickness thereof is preferably 5 nm or less.

The second interface film 205 can be formed of the same material as that of the second interface film 115 described in Embodiment 1 and the function and shape thereof also are the same as those of the second interface film 115.

The second dielectric film 206 can be formed using the mixed dielectric material in the present invention, as the second dielectric film 116 described in Embodiment 1. The function and shape thereof also are the same as those of the second dielectric film 116.

The mixed dielectric film in the present invention may be used for a second dielectric film of at least one information layer. In this case, second dielectric films of other information layers may be formed of a material other than the mixed dielectric material in the present invention. It is preferable that the mixed dielectric film in the present invention be used for the second dielectric film included in the n-th (where n is an integer that satisfies $1 < n \leq N$) information layer. It is desirable that the mixed dielectric film in the present invention be used for a second dielectric film included in an information layer closer to the laser beam incident side.

The reflectance of each information layer in the state where the information recording medium 2 is completed is preferably 1.3% to 6.5%, in order to obtain good signal amplitude. In the information recording medium having three or more information layers, the laser beam 18 has to pass through many information layers when recording/reproduction of information is performed with respect to an information layer disposed farther from the laser beam incident side (information layer nearer to the substrate 11). Thus, it is difficult for the laser beam 18 to reach the information layer nearer to the substrate 11. Accordingly, the reflectance of each information layer is preferably 1.3% to 3.3% so as to obtain good signal amplitude even in such a case. In addition, in order to stabilize the focus servo (pull-in), it is more preferable that the reflectance of the information layers be almost equivalent to each other.

Next, a method for producing the information recording medium 2 described in this embodiment is described.

First, the substrate 11 (with a thickness of 1100 μm, for example) is set in a film forming apparatus.

Subsequently, the reflective film 101, the first dielectric film 102, the first interface film 103, the recording film 104, the second interface film 105 and the second dielectric film 106 are sequentially formed to form the first information layer 21. The respective film forming methods of these films are the same as those described in Embodiment 1.

Subsequently, the optical separation layer 22 is formed on the first dielectric film 106. The film forming method of the optical separation layer 22 is the same as that of each optical separation layer 13 and 15 described in Embodiment 1.

Subsequently, the second information layer 23 is formed, and further the optical separation layer 24 is formed. The film forming method of the second information layer 23 is the same, for example, as that of the n-th information layer 26 described below. The film forming method of the optical separation layer 24 is the same as that of the optical separation layer 22.

Thereafter, a third information layer, a fourth information layer to an (n-1)th information layer each are sequentially formed via an optical separation layer. Further, the optical separation layer 25 is formed on the (n-1)th information layer in the same manner as the optical separation layer 22.

Subsequently, the n-th information layer 26 is formed on the optical separation layer 25. The transmittance adjusting film 200 is formed first. The transmittance adjusting film 200 can be formed in the same manner as the transmittance adjusting film 110 described in Embodiment 1.

Subsequently, the reflective film 201 is formed on the transmittance adjusting film 200. The reflective film 201 can be formed in the same manner as the reflective film 111 described in Embodiment 1.

Subsequently, the first dielectric film 202 is formed on the reflective film 201. The second dielectric film 202 can be formed in the same manner as the first dielectric film 112 described in Embodiment 1.

Subsequently, the first interface film 203 is formed on the first dielectric film 202. The first interface film 203 can be formed in the same manner as the first interface film 113 described in Embodiment 1.

Subsequently, the recording film 204 is formed on the first interface film 203. The recording film 204 can be formed in the same manner as the recording film 114 described in Embodiment 1.

Subsequently, the second interface film 205 is formed on the recording film 204. The second interface film 205 can be formed in the same manner as the second interface film 115 described in Embodiment 1.

Subsequently, the second dielectric film 206 is formed on the second interface film 205. The second dielectric film 206 can be formed in the same manner as the second dielectric film 116 described in Embodiment 1.

As described above, after the n-th information layer 26 is formed, layers up to the (N-1)th information layer each are sequentially stacked via an optical separation layer, and further, the optical separation layer 27, the N-th information layer 28 and the cover layer 17 are formed thereon in this order.

It should be noted that although a configuration in which the n-th information layer 26 is any one of information layers from the third to the (N-1)th information layer is mentioned herein as an example, the n-th information layer 26 may be the N-th information layer. In such a case, after the n-th information layer 26 is formed, the cover layer 17 may be formed thereon.

After the second dielectric film 106 or the second dielectric film 206 is formed, or after each optical separation layer or the cover layer 17 is formed, an initialization process of crystallizing the entire surface of the recording film included in each information layer may be performed, as needed. In all cases, the initialization can be performed by irradiation with a laser beam. Preferably, the laser beam used for the initialization has a wavelength of 790 nm to 830 nm in order to shorten the time required for the initialization by increasing the beam width so that the production cost of the information recording medium can be reduced.

Embodiment 3

Figure 3:
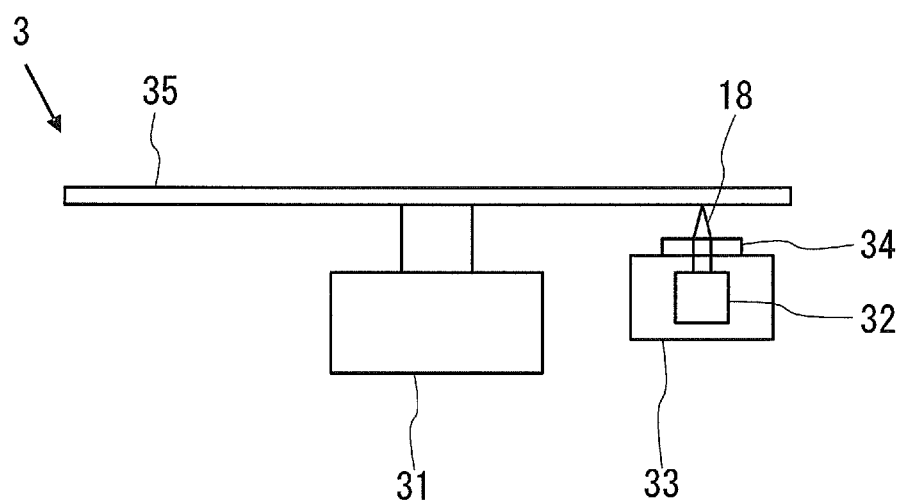
FIG. 3 is a schematic view showing a partial configuration of an example of a recording/reproducing apparatus that performs recording/reproduction of information with respect to the information recording medium of the present invention.

As Embodiment 3 of the present invention, an example of a method for performing recording/reproduction of information with respect to the information recording media 1 described in Embodiment 1 or the information recording media 2 described in Embodiment 2 is described. FIG. 3 schematically shows a partial configuration of a recording/reproducing apparatus 3 that is an example of an apparatus to be used for the recording/reproducing method of this embodiment. The recording/reproducing apparatus 3 includes a spindle motor 31 for rotating an information recording medium 35 (which corresponds to the information recording medium 1 or the information recording medium 2), an optical head 33 provided with a semiconductor laser (laser source) 32, and an objective lens 34 for focusing the laser beam 18 emitted from the semiconductor laser 32.

In order to adjust the spot diameter of the laser beam 18 within the range of 0.4 μm to 0.7 μm, the numerical aperture (NA) of the objective lens 34 preferably falls within the range of 0.5 to 1.0. The wavelength of the laser beam is preferably 450 nm or less (more preferably, 350 nm to 450 nm in the blue-violet region). The linear velocity in recording/reproduction of information is preferably in the range of 2.5 m/s to 25 m/s in which crystallization is less likely to be caused by the reproducing beam and a sufficiently high erasure rate can be obtained.

Recording, erasing, and rewriting of information with respect to the information recording medium 35 are performed by modulating the power of the laser beam 18 among the peak power (write power), the bottom/cooling power, and a bias power (erase power). Irradiation with the laser beam at the peak power causes a part of the recording film in the information recording medium 35 to melt locally, and subsequent irradiation with the laser beam at the bottom/cooling power, which brings about a cooling effect, causes an amorphous phase to be formed thereon. The amorphous phase serves as a recording region (recording mark). Spaces between recording marks are irradiated with the laser beam at a bias power, thereby allowing a crystalline phase to be formed therebetween. The crystalline phase serves as an erased region. A multipulse that is formed of pulse trains is generally used for the irradiation with the laser beam at the peak power. The multipulse may be modulated between the power level of the peak power and the power level of the bias power, or between arbitrary power levels from 0 mW to the peak power. As a method for modulating the pulse, N-1 strategy, N/2 strategy and a CASL-type (dog bone type) method according to the Blu-ray Disc standard, or an arbitrary modulation method can be used.

The mark length and space length can be adjusted to a desired length by providing a periodic clock generated by a pulse generator or the like. In the Blu-ray Disc system, the periodic clock at 1× speed can be set to 66 MHz (=15.15 ns), for example.

When the substrate 11 is provided with a guide groove, information may be recorded on a groove surface (groove) nearer to the laser beam incident side or a groove surface (land) farther from the laser beam incident side, or on both of them.

Information is reproduced by irradiating the information recording medium 35 with a laser beam to allow a detector to read out signals from the information recording medium 35. The power of the laser beam in reproduction is set to a power that has no influence on the optical state of the recording marks and that allows a sufficient amount of reflected light for detecting the recording marks on the information recording medium to be obtained.

FIG. 3 illustrates only a configuration required to describe this embodiment and examples. Some of control circuits and drive circuits, and small components, such as a collective lens and an actuator, are not illustrated. These parts are added thereto in an actual recording/reproducing apparatus, as needed.

EXAMPLES

Hereinafter, the present invention is described in further detail with reference to examples.

Example 1

In Example 1, an information recording medium having the same configuration as the information recording medium 1 shown in FIG. 1 was produced. The method for producing the information recording medium of this example was as follows.

First, a polycarbonate substrate formed with a guide groove (with a depth of 20 nm and a track pitch of 0.32 µm) was prepared as the substrate 11. An Ag—Pd—Cu (containing at least 96 wt % of Ag) film with a thickness of 100 nm to serve as the reflective film 101, a $(Bi_2O_3)_{40} (TiO_2)_{60}$ (mol %) film with a thickness of 10 nm to serve as the first dielectric film 102, a $(ZrO_2)_{35} (SiO_2)_{35} (Cr_2O_3)_{30}$ (mol %) film with a thickness of 5 nm to serve as the first interface film 103, a $Ge_{49.0}Sb_{1.0}In_{3.0}Te_{51.0}$ (atom %) film with a thickness of 9 nm to serve as the recording film 104, a $(ZrO_2)_{35} (SiO_2)_{35} (Cr_2O_3)_{30}$ (mol %) film with a thickness of 5 nm to serve as the second interface film 105 and a $(ZnS)_{80} (SiO_2)_{20}$ (mol %) film to serve as the second dielectric film 106 were sequentially formed on the substrate 11 by sputtering. The thickness of the second dielectric film 106 was determined by calculation based on the matrix method. Specifically, it was determined so that the reflectance of the first information layer 12 was 20% to 25% without the second information layer 14 and the third information layer 16 in the state where the recording film 104 was in the crystalline phase, with respect to a laser beam at 405 nm.

Subsequently, the optical separation layer 13 provided with a guide groove was formed on the first information layer 12, and the second information layer 14 was formed on the optical separation layer 13. A $(Bi_2O_3)_{40} (TiO_2)_{60}$ (mol %) film with a thickness of 17 nm to serve as the transmittance adjusting film 110, an Ag—Pd—Cu (containing at least 96 wt % of Ag) film with a thickness of 10 nm to serve as the reflective film 111, an $Al_2O_3$ film with a thickness of 8 nm to serve as the first dielectric film 112, a $(ZrO_2)_{35} (SiO_2)_{35} (Cr_2O_3)_{30}$ (mol %) film with a thickness of 5 nm to serve as the first interface film 113, a $Ge_{46.3}Sb_{1.0}In_{2.0}Te_{50.7}$ (atom %) film with a thickness of 7.5 nm to serve as the recording film 114, a $(ZrO_2)_{50} (Cr_2O_3)_{50}$ (mol %) film with a thickness of 5 nm to serve as the second interface film 115 and a $(ZnS)_{80} (SiO_2)_{20}$ (mol %) film to serve as the second dielectric film 116 were sequentially formed as the second information layer 14 by sputtering.

The thickness of the second dielectric film 116 was determined by calculation based on the matrix method. Specifically, it was determined so that the reflectance and the transmittance (at the substrate mirror surface) of the second information layer 14, respectively, were 4% to 6% and 45% to 52% without the third information layer 16 in the state where the recording film 114 was in the crystalline phase, with respect to a laser beam at 405 nm.

Subsequently, the optical separation layer 15 provided with a guide groove was formed on the first information layer 14, and the third information layer 16 was formed on the optical separation layer 15. A $(Bi_2O_3)_{40} (TiO_2)_{60}$ (mol %) film with a thickness of 16 nm to serve as the transmittance adjusting film 120, an Ag—Pd—Cu (containing at least 96 wt % of Ag) film with a thickness of 7 nm to serve as the reflective film 121, an $Al_2O_3$ film with a thickness of 8 nm to serve as the first dielectric film 122, a $(ZrO_2)_{35} (SiO_2)_{35} (Cr_2O_3)_{3}$ (mol %) film with a thickness of 5 nm to serve as the first interface film 113, a $Ge_{46.3}Sb_{1.0}In_{2.0}Te_{50.7}$ (atom %) film with a thickness of 6 nm to serve as the recording film 124, a $(ZrO_2)_{50} (Cr_2O_3)_{50}$ (mol %) film with a thickness of 5 nm to serve as the second interface film 125 and the mixed dielectric film in the present invention to serve as the second dielectric film 126 were sequentially formed as the third information layer 16 by sputtering.

The thickness of the second dielectric film 126 was determined by calculation based on the matrix method. Specifically, it was determined so that the reflectance and the transmittance (at the substrate mirror surface) of the third information layer 16, respectively, were 1.5% to 4% and 55% to 60% in the state where the recording film 124 was in the crystalline phase, with respect to a laser beam at 405 nm.

Thereafter, an ultraviolet curable resin was applied onto the second dielectric film 126, followed by spin coating. Then, the resin was cured with ultraviolet rays to form the cover layer 17. Thus, the information recording medium 1 was produced. Finally, an initialization process of crystallizing the entire surfaces of the recording film 104 in the first information layer 12, the recording film 114 in the second information layer 14 and the recording film 124 in the third information layer 16 with a laser beam was performed.

In this example, a mixed dielectric material expressed by $\{(ZnS)_{1-y} (SiO_2)_y\}_{100-x} (D)_x$ (mol %) was used for the mixed dielectric film that was the second dielectric film 126. Samples were produced using materials in which D was $TiO_2$, and (x, y) was set to (2.5, 0.2), (5, 0.2), (7.5, 0.2), (10, 0.2), (20, 0.2), (30, 0.2), (40, 0.2), (7.5, 0.1), (7.5, 0.15), (7.5, 0.3), (7.5, 0.4) and (40, 0.4). The respective discs of these samples were numbered from 1-101 to 1-112. Samples were further produced using materials in which D was $Nb_2O_5$, and (x, y) was set to (2.5, 0.2), (5, 0.2), (7.5, 0.2), (10, 0.2), (20, 0.2), (30, 0.2), (40, 0.2), (7.5, 0.1), (7.5, 0.15), (7.5, 0.3), (7.5, 0.4) and (40, 0.4). The respective discs of these samples were numbered from 1-113 to 1-124.

In this example, the second dielectric film 126 was formed by sputtering using one sputtering target composed of ZnS, $SiO_2$ and ($TiO_2$ or $Nb_2O_5$) (first method). Specifically, respective mixed dielectric films were formed using a sputtering target made of $\{(ZnS)_{0.8} (SiO_2)_{2.2}\}_{97.5} (TiO_2)_{2.5}$ (mol %), a sputtering target made of $\{(ZnS)_{0.8} (SiO_2)_{0.2}\}_{95} (TiO_2)_5$ (mol %), a sputtering target made of $\{(ZnS)_{0.8} (SiO_2)_{0.2}\}_{92.5} (TiO_2)_{7.5}$ (mol %), a sputtering target made of $\{(ZnS)_{0.8} (SiO_2)_{0.2}\}_{90} (TiO_2)_{10}$ (mol %), a sputtering target made of $\{(ZnS)_{0.8} (SiO_2)_{0.2}\}_{80} (TiO_2)_{20}$ (mol %), target made of $\{(ZnS)_{0.8} (SiO_2)_{0.2}\}_{70} (TiO_2)_{30}$ (mol %), a sputtering target made of $\{(ZnS)_{0.8} (SiO_2)_{0.2}\}_{60} (TiO_2)_{40}$ (mol %), a sputtering target made of $\{(ZnS)_{0.9} (SiO_2)_{0.1}\}_{92.5} (TiO_2)_{7.5}$ (mol %), a sputtering target made of $\{(ZnS)_{0.85} (SiO_2)_{0.15}\}_{92.5} (TiO_2)_{7.5}$ (mol %), a sputtering target made of $\{(ZnS)_{0.7} (SiO_2)_{0.3}\}_{92.5} (TiO_2)_{7.5}$ (mol %), a sputtering target made of $\{(ZnS)_{0.6} (SiO_2)_{0.4}\}_{92.5} (TiO_2)_{7.5}$ (mol %) and a sputtering target made of $\{(ZnS)_{0.6} (SiO_2)_{0.4}\}_{60} (TiO_2)_{40}$ (mol %) so as to have the corresponding compositions thereto. Further, using these sputtering targets with compositions in which $TiO_2$ was substituted by $Nb_2O_5$, respective mixed dielectric films having the corresponding compositions thereto were formed.

In addition, samples with the second dielectric film 126 formed by another method (second method) were separately produced. In this method, the second dielectric film 126 was formed by simultaneous sputtering of a sputtering target made of ZnS and $SiO_2$, and a $TiO_2$ sputtering target or an $Nb_2O_5$ sputtering target, using two RF cathodes. Specifically, respective mixed dielectric films having compositions of $\{(ZnS)_{0.8} (SiO_2)_{0.2}\}_{97.5} (TiO_2)_{2.5}$ (mol %); $\{(ZnS)_{0.8} (SiO_2)_{0.2}\}_{95} (TiO_2)_5$ (mol %); $\{(ZnS)_{0.8} (SiO_2)_{0.2}\}_{92.5} (TiO_2)_{7.5}$ (mol %); $\{(ZnS)_{0.8} (SiO_2)_{0.2}\}_{90} (TiO_2)_{10}$ (mol %); $\{(ZnS)_{0.8} (SiO_2)_{0.2}\}_{80} (TiO_2)_{20}$ (mol %); $\{(ZnS)_{0.8} (SiO_2)_{0.2}\}_{70} (TiO_2)_{30}$ (mol %); and $\{(ZnS)_{0.8} (SiO_2)_{0.2}\}_{60} (TiO_2)_{40}$ (mol %) were formed using a sputtering target made of $(ZnS)_{80} (SiO_2)_{20}$ (mol %) and a $TiO_2$ sputtering target, with the power of the RF source adjusted. Further, respective mixed dielectric films having compositions of $\{(ZnS)_{0.9} (SiO_2)_{0.1}\}_{92.5} (TiO_2)_{7.5}$ (mol %); $\{(ZnS)_{0.85} (SiO_2)_{0.15}\}_{92.5} (TiO_2)_{7.5}$ (mol %); $\{(ZnS)_{0.7} (SiO_2)_{0.3}\}_{92.5} (TiO_2)_{7.5}$ (mol %); $\{(ZnS)_{0.6} (SiO_2)_{0.4}\}_{92.5} (TiO_2)_{7.5}$ (mol %); and $\{(ZnS)_{0.6} (SiO_2)_{0.4}\}_{60} (TiO_2)_{40}$ (mol %) were formed using a sputtering target made of $(ZnS)_{90} (SiO_2)_{10}$ (mol %), a sputtering target made of $(ZnS)_{85} (SiO_2)_{15}$ (mol %), a sputtering target made of $(ZnS)_{70} (SiO_2)_{30}$ (mol %), or a sputtering target made of $(ZnS)_{60} (SiO_2)_{40}$ (mol %) and a $TiO_2$ sputtering target, with the power of the RF source adjusted. Furthermore, respective mixed dielectric films having compositions of: $\{(ZnS)_{0.8} (SiO_2)_{0.2}\}_{97.5} (Nb_2O_5)_{2.5}$ (mol %); $\{(ZnS)_{0.8} (SiO_2)_{0.2}\}_{95} (Nb_2O_5)_5$ (mol %); $\{(ZnS)_{0.8} (SiO_2)_{0.2}\}_{92.5} (Nb_2O_5)_{7.5}$ (mol %); $\{(ZnS)_{0.8} (SiO_2)_{0.2}\}_{90} (Nb_2O_5)_{10}$ (mol %); $\{(ZnS)_{0.8} (SiO_2)_{0.2}\}_{80} (Nb_2O_5)_{20}$ (mol %); and $\{(ZnS)_{0.8} (SiO_2)_{0.2}\}_{70} (Nb_2O_5)_{30}$ (mol %) were formed using a sputtering target made of $(ZnS)_{80} (SiO_2)_{20}$ (mol %) and an $Nb_2O_5$ sputtering target, with the power of the RF source adjusted. Moreover, respective mixed dielectric films having compositions of: $\{(ZnS)_{0.9} (SiO_2)_{0.1}\}_{92.5} (Nb_2O_5)_{7.5}$ (mol %); $\{(ZnS)_{0.85} (SiO_2)_{0.15}\}_{92.5} (Nb_2O_5)_{7.5}$ (mol %); $\{(ZnS)_{0.7} (SiO_2)_{0.3}\}_{92.5} (Nb_2O_5)_{7.5}$ (mol %); $\{(ZnS)_{0.6} (SiO_2)_{0.4}\}_{92.5} (Nb_2O_5)_{7.5}$ (mol %); and $\{(ZnS)_{0.6} (SiO_2)_{0.4}\}_{60} (Nb_2O_5)_{40}$ (mol %) were formed using a sputtering target made of $(ZnS)_{90} (SiO_2)_{10}$ (mol %), a sputtering target made of $(ZnS)_{85} (SiO_2)_{15}$ (mol %), a sputtering target made of $(ZnS)_{70} (SiO_2)_{30}$ (mol %), or a sputtering target made of $(ZnS)_{60} (SiO_2)_{40}$ (mol %) and an $Nb_2O_5$ sputtering target, with the power of the RF source adjusted.

In this way, respective mixed dielectric films having slightly adjusted compositions were produced using two kinds of sputtering targets. Both kinds of the samples produced by the first method and the samples produced by the second method were prepared for each of the Disc Nos. 1-101 to 1-124.

As a comparative sample, a conventional information recording medium (Disc No. 1-001) also was produced using a $(ZnS)_{80} (SiO_2)_{20}$ (mol %) film for the second dielectric film 126 of the information recording medium with the above-mentioned configuration.

Each sample of the information recording medium produced above was evaluated as follows.

<Optical Constant>

First, the optical constant (refractive index n and extinction coefficient k) at a wavelength of 405 nm was measured for the mixed dielectric material that has been used for the second dielectric film 126 with a spectroscopic ellipsometer. Samples other than those produced by the above-mentioned methods were produced for measurement of the refractive index. The samples for measurement of the refractive index were formed by sputtering a material for the second dielectric film 126 onto a quartz substrate.

<Signal Quality Evaluation>

The signal quality of each sample was evaluated using the recording/reproducing apparatus 3 shown in FIG. 3. The wavelength of the laser beam was 405 nm and the numerical aperture NA of the object lens was 0.85. Information was recorded on a groove (groove surface nearer to the laser incident side). The linear velocity for recording and reproduction was set to 7.36 m/s, and the periodic clock was set to 66 MHz (where the shortest mark length (2T) was 0.111 μm from the relationship between the linear velocity and the periodic clock, which was equivalent to 2× speed recording of 33.4 GB per information layer). The reproduction power was set to 1.4 mW for the first and second information layers and 1.1 mW for the third information layer. An unmodulated laser beam was used as the reproducing beam.

The signal quality was evaluated by recording a 8T mark 10 times and measuring the modulation degree thereof. The modulation degree of 50% or more was evaluated as ⊚, that of 45% or more but less than 50% was evaluated as ○, that of 40% or more but less than 45% was evaluated as Δ, and that of less than 40% was evaluated as x.

<Reproduction Durability Evaluation>

The apparatus used for recording/reproduction, the linear velocity for recording and reproduction and the periodic clock were the same as those in the signal quality evaluation. The reproduction durability was evaluated by recording random signals of 2T to 9T and counting the number of reproduction times in which the SER (Symbol Error Rate) exceeds the reference value of $1.0\times10^{-3}$. The reproduction power was set to 2.2 mW for the first information layer, 1.6 mW for the second information layer and 1.2 mW for the third information layer. An unmodulated laser beam was used as the reproducing beam. The number of reproduction times of one million or more was evaluated as ⊚, that of half a million or more but less than one million was evaluated as ○, that of one hundred thousand or more but less than half a million was evaluated as Δ, and that of less than one hundred thousand was evaluated as x. The random marks subjected to the evaluation were recorded using the N-1 modulation method and DOW10 (Direct Overwrite 10) recording by setting the write power, the erase power and the bottom/cooling power to values that allow the best SER in each sample.

<Signal Storage Stability Evaluation>

The apparatus used for recording/reproduction, the linear velocity for recording and reproduction and the periodic clock were the same as those in the signal quality evaluation. The signal storage stability was evaluated by recording random signals of 2T to 9T, conducting an accelerated test for the information recording medium in a thermostatic bath at 80° C. and 20% RH (Relative Humidity) for 50 hours, and determining the degradation of the SER from before the accelerated test. The degradation of $+1.0\times10^{-4}$ or less was evaluated as ⊚, that of more than $+1.0\times10^{-4}$ but not more than $+5.0\times10^{-4}$ was evaluated as ○, that of more than $+5.0\times10^{-4}$ but not more than $+1.0\times10^{-3}$ was evaluated as Δ, that of more than $+1.0\times10^{-3}$ was evaluated as x. The random marks subjected to the evaluation were recorded using the N-1 modulation method and DOW10 (Direct Overwrite 10) recording by setting the write power, the erase power, the bottom/cooling power to values that allow the best SER in each information recording medium, in the same manner as in the reproduction durability evaluation.

The third information layer 16 of each sample in this example was evaluated by the above-mentioned evaluation methods. Table 1 shows the results. Table 1 also shows a comprehensive evaluation on the signal quality, the reproduction durability and the signal storage stability. In the comprehensive evaluation, x indicates that at least one item was evaluated as x, Δ indicates that no item was evaluated as x and at least two items were evaluated as Δ, ○ indicates that no item was evaluated as x and not more than one item was evaluated as Δ, or all the items were evaluated as ○, and ⊚ indicates that no item was evaluated as Δ or x and at least one item was evaluated as ⊚. Although the results shown in Table 1 were obtained for the samples produced by the above-mentioned second method, the same results were obtained also for the samples produced by the above-mentioned first method, when the same evaluations were conducted.

The information recording media evaluated as × in the comprehensive evaluation were not practically usable. However, the information recording media evaluated as Δ, ○, or ◎ were practically usable. Among the practically usable information recording media, those evaluated as ○ were superior to those evaluated as Δ, and those evaluated as ◎ were further superior thereto.

As another example, a mixed dielectric material expressed by $\{(ZnS)_{1-y}(SiO_2)_y\}_{100-x}(D)_x$ (mol %) was used for the mixed dielectric film that was the second dielectric film 126. Samples also were produced using materials in which (x, y) was set to (7.5, 0.2), and D was $TiO_2$, $Nb_2O_5$, $Ta_2O_5$, $CeO_2$, $(TiO_2)_{0.5}(Nb_2O_5)_{0.5}$, $(TiO_2)_{0.5}(Ta_2O_5)_{0.5}$ and $(TiO_2)_{0.5}(CeO_2)_{0.5}$ were produced. The respective discs of these samples were numbered from 1-125 to 1-131. Samples were further produced using materials in which (x, y) was set to

TABLE 1

| Disc No. | D | x | y | Optical constant n-ik | Signal quality | Reproduction durability | Signal storage stability | Comprehensive evaluation |
|---|---|---|---|---|---|---|---|---|
| 1-101 | $TiO_2$ | 2.5 | 0.2 | 2.29-i0.01 | ◎ | ○ | ○ | ◎ |
| 1-102 | $TiO_2$ | 5 | 0.2 | 2.31-i0.01 | ◎ | ◎ | ◎ | ◎ |
| 1-103 | $TiO_2$ | 7.5 | 0.2 | 2.32-i0.01 | ◎ | ◎ | ◎ | ◎ |
| 1-104 | $TiO_2$ | 10 | 0.2 | 2.33-i0.02 | ◎ | ◎ | ◎ | ◎ |
| 1-105 | $TiO_2$ | 20 | 0.2 | 2.35-i0.03 | ○ | ◎ | ◎ | ◎ |
| 1-106 | $TiO_2$ | 30 | 0.2 | 2.39-i0.04 | ○ | ◎ | ◎ | ◎ |
| 1-107 | $TiO_2$ | 40 | 0.2 | 2.43-i0.05 | Δ | ○ | ◎ | ○ |
| 1-108 | $TiO_2$ | 7.5 | 0.1 | 2.38-i0.01 | ◎ | ○ | ◎ | ◎ |
| 1-109 | $TiO_2$ | 7.5 | 0.15 | 2.35-i0.01 | ◎ | ◎ | ◎ | ◎ |
| 1-110 | $TiO_2$ | 7.5 | 0.3 | 2.26-i0.01 | ◎ | ◎ | ◎ | ◎ |
| 1-111 | $TiO_2$ | 7.5 | 0.4 | 2.17-i0.01 | ○ | ○ | ○ | ○ |
| 1-112 | $TiO_2$ | 40 | 0.4 | 2.27-i0.05 | Δ | ○ | ○ | ○ |
| 1-113 | $Nb_2O_5$ | 2.5 | 0.2 | 2.28-i0.01 | ◎ | ○ | ○ | ◎ |
| 1-114 | $Nb_2O_5$ | 5 | 0.2 | 2.29-i0.01 | ◎ | ◎ | ◎ | ◎ |
| 1-115 | $Nb_2O_5$ | 7.5 | 0.2 | 2.30-i0.01 | ◎ | ◎ | ◎ | ◎ |
| 1-116 | $Nb_2O_5$ | 10 | 0.2 | 2.32-i0.02 | ◎ | ◎ | ◎ | ◎ |
| 1-117 | $Nb_2O_5$ | 20 | 0.2 | 2.34-i0.03 | ○ | ◎ | ◎ | ◎ |
| 1-118 | $Nb_2O_5$ | 30 | 0.2 | 2.37-i0.04 | ○ | ◎ | ◎ | ◎ |
| 1-119 | $Nb_2O_5$ | 40 | 0.2 | 2.39-i0.05 | Δ | ○ | ◎ | ○ |
| 1-120 | $Nb_2O_5$ | 7.5 | 0.1 | 2.36-i0.01 | ◎ | ○ | ◎ | ◎ |
| 1-121 | $Nb_2O_5$ | 7.5 | 0.15 | 2.33-i0.01 | ◎ | ◎ | ◎ | ◎ |
| 1-122 | $Nb_2O_5$ | 7.5 | 0.3 | 2.23-i0.01 | ◎ | ◎ | ◎ | ◎ |
| 1-123 | $Nb_2O_5$ | 7.5 | 0.4 | 2.14-i0.01 | Δ | ○ | ○ | ○ |
| 1-124 | $Nb_2O_5$ | 40 | 0.4 | 2.25-i0.05 | Δ | ○ | ○ | ○ |
| 1-001 | — | 0 | 0.2 | 2.28-i0.01 | ◎ | X | Δ | X |

As shown in Table 1, all the information recording media (Disc Nos. 1-101 to 1-124) in this example resulted in significantly improved reproduction durability and signal storage stability, compared to Disc No. 1-001 that was a conventional example. The signal quality was evaluated as Δ for Disc Nos. 1-107, 1-112, 1-119, 1-123 and 1-124. This is probably because the refractive index n of less than 2.15 or the extinction coefficient k of 0.05 or more caused a decrease in the contrast (reflectance ratio) between the reflectance when the recording film was in the crystalline phase and the reflectance when it was in the amorphous phase, which led to a decrease in the modulation degree. These results demonstrated that the mixed dielectric film preferably has a refractive index of at least 2.15 and an extinction coefficient of not more than 0.04 at a wavelength of about 405 nm (wavelength of 400 nm to 410 nm). It is considered from the results shown in Table 1 that such optical properties are made easier to achieve by setting the content of D in the mixed dielectric film to not more than 30 mol %, and are made further easier to achieve by setting the value of y to not more than 0.3, though they differ from the kind of D contained in the mixed dielectric film to some extent. All the samples of Disc Nos. 1-107, 1-112, 1-119, 1-123 and 1-124 were evaluated as ○, as shown in the comprehensive evaluation, and were practically usable. Further, it was confirmed that the second dielectric film 126 formed from one sputtering target and the second dielectric film 126 formed from two sputtering targets (RF cathodes) showed the same performance. From these results, either of the film forming methods was found to be usable for forming the second dielectric film 126.

(20, 0.2), and D was $TiO_2$, $Nb_2O_5$, $Ta_2O_5$, $CeO_2$, $(TiO_2)_{0.5}(Nb_2O_5)_{0.5}$, $(TiO_2)_{0.5}(Ta_2O_5)_{0.5}$ and $(TiO_2)_{0.5}(CeO_2)_{0.5}$. The respective discs of these samples were numbered from 1-132 to 1-138.

Further, in each of Disc Nos. 1-125 to 1-138, the second dielectric film 126 was formed by sputtering using one sputtering target that contained ZnS, $SiO_2$, and at least one of $TiO_2$, $Nb_2O_5$, $Ta_2O_5$ and $CeO_2$ (third method). Specifically, respective mixed dielectric films were formed using a sputtering target made of $\{(ZnS)_{0.8}(SiO_2)_{0.2}\}_{92.5}(TiO_2)_{7.5}$ (mol %), a sputtering target made of $\{(ZnS)_{0.8}(SiO_2)_{0.2}\}_{92.5}(Nb_2O_5)_{7.5}$ (mol %), a sputtering target made of $\{(ZnS)_{0.8}(SiO_2)_{0.2}\}_{92.5}(Ta_2O_5)_{7.5}$ (mol %), a sputtering target made of $\{(ZnS)_{0.8}(SiO_2)_{0.2}\}_{92.5}(CeO_2)_{7.5}$ (mol %), a sputtering target made of $\{(ZnS)_{0.8}(SiO_2)_{0.2}\}_{92.5}\{(TiO_2)_{0.5}(Nb_2O_5)_{0.5}\}_{7.5}$ (mol %), a sputtering target made of $\{(ZnS)_{0.8}(SiO_2)_{0.2}\}_{92.5}\{(TiO_2)_{0.5}(Ta_2O_5)_{0.5}\}_{7.5}$ (mol %), a sputtering target made of $\{(ZnS)_{0.8}(SiO_2)_{0.2}\}_{92.5}\{(TiO_2)_{0.5}(CeO_2)_{0.5}\}_{7.5}$ (mol %), a sputtering target made of $\{(ZnS)_{0.8}(SiO_2)_{0.2}\}_{80}(TiO_2)_{20}$ (mol %), a sputtering target made of $\{(ZnS)_{0.8}(SiO_2)_{0.2}\}_{80}(Nb_2O_5)_{20}$ (mol %), a sputtering target made of $\{(ZnS)_{0.8}(SiO_2)_{0.2}\}_{80}(Ta_2O_5)_{20}$ (mol %), a sputtering target made of $\{(ZnS)_{0.8}(SiO_2)_{0.2}\}_{80}(CeO_2)_{20}$ (mol %), a sputtering target made of $\{(ZnS)_{0.8}(SiO_2)_{0.2}\}_{80}\{(TiO_2)_{0.5}(Nb_2O_5)_{0.5}\}_{20}$ (mol %), a sputtering target made of $\{(ZnS)_{0.8}(SiO_2)_{0.2}\}_{80}\{(TiO_2)_{0.5}(Ta_2O_5)_{0.5}\}_{20}$ (mol %), and a sputtering target made of $\{(ZnS)_{0.8}(SiO_2)_{0.2}\}_{80}\{(TiO_2)_{0.5}(CeO_2)_{0.5}\}_{20}$ (mol %) so as to have the corresponding compositions to the sputtering targets.

In addition, samples formed by sputtering of a sputtering target made of ZnS and $SiO_2$ and a sputtering target made of at least one of $TiO_2$, $Nb_2O_5$, $Ta_2O_5$ and $CeO_2$ using two RF cathodes also were prepared as another film forming method of the second dielectric film 126 (fourth method). Specifically, films of $\{(ZnS)_{0.8}(SiO_2)_{0.2}\}_{92.5}(TiO_2)_{7.5}$ (mol %) and $\{(ZnS)_{0.8}(SiO_2)_{0.2}\}_{80}(TiO_2)_{20}$ (mol %) were formed using a sputtering target made of $(ZnS)_{80}(SiO_2)_{20}$ (mol %) and a $TiO_2$ sputtering target, with the power of the RF source adjusted. Further, films of $\{(ZnS)_{0.8}(SiO_2)_{0.2}\}_{92.5}(Nb_2O_5)_{7.5}$ (mol %) and $\{(ZnS)_{0.8}(SiO_2)_{0.2}\}_{80}(Nb_2O_5)_{20}$ (mol %) were formed using a sputtering target made of $(ZnS)_{80}(SiO_2)_{20}$ (mol %) and an $Nb_2O_5$ sputtering target, with the power of the RF source adjusted. Further, films of $\{(ZnS)_{0.8}(SiO_2)_{0.2}\}_{92.5}$ $(Ta_2O_5)_{7.5}$ (mol %) and $\{(ZnS)_{0.8}(SiO_2)_{0.2}\}_{80}(Ta_2O_5)_{20}$ (mol %) were formed using a sputtering target made of $(ZnS)_{80}(SiO_2)_{20}$ (mol %) and a $Ta_2O_5$ sputtering target, with the power of the RF source adjusted. Further, films of $\{(ZnS)_{0.8}(SiO_2)_{0.2}\}_{92.5}(CeO_2)_{7.5}$ (mol %) and $\{(ZnS)_{0.8}(SiO_2)_{0.2}\}_{80}(CeO_2)_{20}$ (mol %) were formed using a sputtering target made of $(ZnS)_{80}(SiO_2)_{20}$ (mol %) and a $CeO_2$ sputtering target, with the power of the RF source adjusted. Films of $\{(ZnS)_{0.8}(SiO_2)_{0.2}\}_{92.5}\{(TiO_2)_{0.5}(Nb_2O_5)_{0.5}\}_{7.5}$ (mol %) and $\{(ZnS)_{0.8}(SiO_2)_{0.2}\}_{80}\{(TiO_2)_{0.5}(Nb_2O_5)_{0.5}\}_{20}$ (mol %) were formed using a sputtering target made of $(ZnS)_{80}(SiO_2)_{20}$ (mol %) and a sputtering target made of $(TiO_2)_{50}(Nb_2O_5)_{50}$ (mol %), with the power of the RF source adjusted. Films of $\{(ZnS)_{0.8}(SiO_2)_{0.2}\}_{92.5}\{(TiO_2)_{0.5}(Ta_2O_5)_{0.5}\}_{7.5}$ (mol %) and $\{(ZnS)_{0.8}(SiO_2)_{0.2}\}_{80}\{(TiO_2)_{0.5}(Ta_2O_5)_{0.5}\}_{20}$ (mol %) were formed using a sputtering target made of $(ZnS)_{80}(SiO_2)_{20}$ (mol %) and a sputtering target made of $(TiO_2)_{50}(Ta_2O_5)_{50}$ (mol %), with the power of the RF source adjusted. Films of $\{(ZnS)_{0.8}(SiO_2)_{0.2}\}_{92.5}\{(TiO_2)_{0.5}(CeO_2)_{0.5}\}_{7.5}$ (mol %) and $\{(ZnS)_{0.8}(SiO_2)_{0.2}\}_{80}\{(TiO_2)_{0.5}(CeO_2)_{0.5}\}_{20}$ (mol %) were formed using a sputtering target made of $(ZnS)_{80}(SiO_2)_{20}$ (mol %) and a sputtering target made of $(TiO_2)_{50}(CeO_2)_{50}$ (mol %), with the power of the RF source adjusted.

Both kinds of the samples produced by the third method and the samples produced by the fourth method were prepared for each of the Disc Nos. 1-125 to 1-138.

As a comparative sample, information recording media (Disc Nos. 1-002 to 1-004) also were produced using a $\{(ZnS)_{0.8}(SiO_2)_{0.2}\}_{80}(Al_2O_3)_{20}$ (mol %) film, a $\{(ZnS)_{0.8}(SiO_2)_{0.2}\}_{80}(MgO)_{20}$ (mol %) film, and a $\{(ZnS)_{0.8}(SiO_2)_{0.2}\}_{80}(SnO_2)_{20}$ (mol %) film for the second dielectric film 126 of the respective information recording media with the above-mentioned configuration.

The signal quality, the reproduction durability and the signal storage stability of the third information layer 16 were evaluated for each sample thus produced in the same manner as in the aforementioned evaluation method. Table 2 shows the results. The evaluation criteria for ⊚, ○, Δ, and x in each of the evaluation items were the same as described above. Although the results shown in Table 2 were obtained for the samples produced by the above-mentioned fourth method, the same results were obtained also for the samples produced by the above-mentioned third method, when the same evaluations were conducted.

TABLE 2

| Disc No. | D | x | y | Optical constant n-ik | Signal quality | Reproduction durability | Signal storage stability | Comprehensive evaluation |
|---|---|---|---|---|---|---|---|---|
| 1-125 | $TiO_2$ | 7.5 | 0.2 | 2.32-i0.01 | ⊚ | ⊚ | ⊚ | ⊚ |
| 1-126 | $Nb_2O_5$ | 7.5 | 0.2 | 2.30-i0.01 | ⊚ | ⊚ | ⊚ | ⊚ |
| 1-127 | $Ta_2O_5$ | 7.5 | 0.2 | 2.29-i0.01 | ⊚ | ○ | ○ | ⊚ |
| 1-128 | $CeO_2$ | 7.5 | 0.2 | 2.32-i0.01 | ⊚ | Δ | Δ | Δ |
| 1-129 | $(TiO_2)_{0.5}(Nb_2O_5)_{0.5}$ | 7.5 | 0.2 | 2.31-i0.01 | ⊚ | ⊚ | ⊚ | ⊚ |
| 1-130 | $(TiO_2)_{0.5}(Ta_2O_5)_{0.5}$ | 7.5 | 0.2 | 2.30-i0.01 | ⊚ | ○ | ○ | ⊚ |
| 1-131 | $(TiO_2)_{0.5}(CeO_5)_{0.5}$ | 7.5 | 0.2 | 2.32-i0.01 | ⊚ | ○ | ○ | ⊚ |
| 1-132 | $TiO_2$ | 20 | 0.2 | 2.35-i0.03 | ○ | ⊚ | ⊚ | ⊚ |
| 1-133 | $Nb_2O_5$ | 20 | 0.2 | 2.34-i0.03 | ○ | ⊚ | ⊚ | ⊚ |
| 1-134 | $Ta_2O_5$ | 20 | 0.2 | 2.31-i0.05 | Δ | ○ | ○ | ○ |
| 1-135 | $CeO_2$ | 20 | 0.2 | 2.35-i0.03 | ○ | ○ | Δ | ○ |
| 1-136 | $(TiO_2)_{0.5}(Nb_2O_5)_{0.5}$ | 20 | 0.2 | 2.35-i0.03 | ○ | ⊚ | ⊚ | ⊚ |
| 1-137 | $(TiO_2)_{0.5}(Ta_2O_5)_{0.5}$ | 20 | 0.2 | 2.33-i0.04 | ○ | ○ | ○ | ○ |
| 1-138 | $(TiO_2)_{0.5}(CeO_2)_{0.5}$ | 20 | 0.2 | 2.35-i0.03 | ○ | ○ | ○ | ○ |
| 1-001 | — | 0 | 0.2 | 2.28-i0.01 | ⊚ | X | Δ | X |
| 1-002 | $Al_2O_3$ | 20 | 0.2 | 2.12-i0.01 | X | ○ | Δ | X |
| 1-003 | MgO | 20 | 0.2 | 2.30-i0.08 | Δ | ○ | X | X |
| 1-004 | $SnO_2$ | 20 | 0.2 | 2.24-i0.15 | X | Δ | X | X |

As shown in Table 2, all the information recording media (Disc Nos. 1-125 to 1-138) in this example resulted in significantly improved reproduction durability and signal storage stability, compared to Disc No. 1-001 that was a conventional example. In the evaluations of the reproduction durability and the signal storage stability, a more significant improvement was shown in dielectrics that contain $TiO_2$ and/or $Nb_2O_5$ as D than in dielectrics that contain $Ta_2O_5$ and/or $CeO_2$ as D, when the content of D was the same. This is probably because the thermal conductivity of $TiO_2$ and $Nb_2O_5$ is higher than that of $Ta_2O_5$ and $CeO_2$, and thus heat stored in the recording film can be dissipated more efficiently. Accordingly, at least one selected from $TiO_2$ and $Nb_2O_5$ was found to be preferable as D. Additionally, all the samples containing $Ta_2O_5$ or $CeO_2$ as D were evaluated as A or o, as shown in the comprehensive evaluation, and were practically usable. Further, the second dielectric film 126 formed from one target and the second dielectric film 126 formed from two targets (RF cathodes) showed the same performance and thus either of the film forming methods was usable for forming the second dielectric film 126.

The signal quality and/or the signal storage stability were evaluated as x for all the samples of Disc Nos. 1-002 to 1-004 in which an oxide other than Ti oxide, Nb oxide, Ta oxide and Ce oxide was added to the mixture of ZnS and $SiO_2$, and the comprehensive evaluation thereof was x. These results demonstrated that it was hard for a material in which an oxide other than Ti oxide, Nb oxide, Ta oxide and Ce oxide was added to the mixture of ZnS and $SiO_2$ to achieve an information recording medium with all of good signal quality, reproduction durability and signal storage stability.

As described above, according to the configuration of the present invention, information recording media having superior properties to conventional information recording media were obtained.

Example 2

In Example 2, another example of the information recording medium 1 shown in FIG. 1 was produced. In this example, the second dielectric layer 116 of the second information layer 14 and the second dielectric layer 126 of the third information layer 16 were different from those in the information recording medium of Example 1. However, the configurations other than these were the same as those in Example 1.

In this example, the mixed dielectric film in the present invention was used for the second dielectric layer 116 of the second information layer 14 in the information recording medium 1 shown in Example 1. The thickness of the second dielectric film 116 was determined by calculation based on the matrix method. Specifically, it was determined in the same manner as in Example 1 so that the reflectance and the transmittance (at the substrate mirror surface) of the second information layer 14, respectively, were 4% to 6% and 45% to 52% without the third information layer 16 in the state where the recording film 114 was in the crystalline phase, with respect to a laser beam at 405 nm.

In this example, a mixed dielectric material expressed by $\{(ZnS)_{1-y}(SiO_2)_y\}_{100-x}(D)_x$ (mol %) was used for the mixed dielectric film that was the second dielectric film 116. Samples were produced using materials in which D was $TiO_2$, and (x, y) was set to (2.5, 0.2), (5, 0.2), (7.5, 0.2), (10, 0.2), (20, 0.2), (30, 0.2), (40, 0.2), (7.5, 0.1), (7.5, 0.15), (7.5, 0.3), (7.5, 0.4) and (40, 0.4). The respective discs of these samples were numbered from 2-101 to 2-112. Samples were further produced using materials in which D was $Nb_2O_5$, and (x, y) was set to (2.5, 0.2), (5, 0.2), (7.5, 0.2), (10, 0.2), (20, 0.2), (30, 0.2), (40, 0.2), (7.5, 0.1), (7.5, 0.15), (7.5, 0.3), (7.5, 0.4) and (40, 0.4). The respective discs of these samples were numbered from 2-113 to 2-124.

Both kinds of the samples in which the second dielectric film 116 was formed by sputtering using one sputtering target that contained ZnS, $SiO_2$ and ($TiO_2$ or $Nb_2O_5$), as in the first method in Example 1, and the samples in which the second dielectric film 116 was formed by simultaneous sputtering of a sputtering target that contained ZnS and $SiO_2$ and a $TiO_2$ or $Nb_2O_5$ sputtering target, using two RF cathodes, as in the second method of Example 1, were prepared for each of the Disc Nos. 2-101 to 2-124.

As a comparative sample, a conventional information recording medium (Disc No. 2-001) also was produced using a $(ZnS)_{80}(SiO_2)_{20}$ (mol %) film for the second dielectric film 116 of the information recording medium with the above-mentioned configuration.

In this example, a $\{(ZnS)_{0.8}(SiO_2)_{0.2}\}_{92.5}(TiO_2)_{7.5}$ (mol %) film that was the mixed dielectric film of the present invention was used for the second dielectric film 126 of the third information layer 16. The thickness of the second dielectric film 126 was determined by calculation based on the matrix method. Specifically, it was determined in the same manner as in Example 1 so that the reflectance and the transmittance (at the substrate mirror surface) of the third information layer 16, respectively, were 1.5% to 4% and 55% to 60% in the state where the recording film 124 was in the crystalline phase, with respect to a laser beam at 405 nm.

The second dielectric film 126 was formed by sputtering using one sputtering target that contains ZnS, $SiO_2$ and $TiO_2$.

The film materials and configurations of other information layers, and the production processes thereof were the same as in Example 1.

The signal quality, the reproduction durability and the signal storage stability of the second information layer 14 were evaluated for each sample thus produced according to the evaluation method shown in Example 1. Table 3 shows the results. The evaluation criteria for ⊚, ○, Δ, and x in each of the evaluation items were the same as described above. Although the results shown in Table 3 were obtained for the samples produced by the above-mentioned second method, the same results were obtained also for the samples produced by the above-mentioned first method, when the same evaluations were conducted.

TABLE 3

| Disc No. | D | x | y | Optical constant n-ik | Signal quality | Reproduction durability | Signal storage stability | Comprehensive evaluation |
|---|---|---|---|---|---|---|---|---|
| 2-101 | $TiO_2$ | 2.5 | 0.2 | 2.29-i0.01 | ⊚ | ○ | ○ | ⊚ |
| 2-102 | $TiO_2$ | 5 | 0.2 | 2.31-i0.01 | ⊚ | ⊚ | ⊚ | ⊚ |
| 2-103 | $TiO_2$ | 7.5 | 0.2 | 2.32-i0.01 | ⊚ | ⊚ | ⊚ | ⊚ |
| 2-104 | $TiO_2$ | 10 | 0.2 | 2.33-i0.02 | ○ | ⊚ | ⊚ | ⊚ |
| 2-105 | $TiO_2$ | 20 | 0.2 | 2.35-i0.03 | ○ | ⊚ | ⊚ | ⊚ |
| 2-106 | $TiO_2$ | 30 | 0.2 | 2.39-i0.04 | ○ | ⊚ | ⊚ | ⊚ |
| 2-107 | $TiO_2$ | 40 | 0.2 | 2.43-i0.05 | Δ | ○ | ⊚ | ○ |
| 2-108 | $TiO_2$ | 7.5 | 0.1 | 2.38-i0.01 | ⊚ | ○ | ⊚ | ⊚ |
| 2-109 | $TiO_2$ | 7.5 | 0.15 | 2.35-i0.01 | ⊚ | ⊚ | ⊚ | ⊚ |
| 2-110 | $TiO_2$ | 7.5 | 0.3 | 2.26-i0.01 | ○ | ⊚ | ⊚ | ⊚ |
| 2-111 | $TiO_2$ | 7.5 | 0.4 | 2.17-i0.01 | ○ | ○ | ○ | ○ |
| 2-112 | $TiO_2$ | 40 | 0.4 | 2.27-i0.05 | Δ | ○ | ○ | ○ |
| 2-113 | $Nb_2O_5$ | 2.5 | 0.2 | 2.28-i0.01 | ⊚ | ○ | ○ | ○ |
| 2-114 | $Nb_2O_5$ | 5 | 0.2 | 2.29-i0.01 | ⊚ | ⊚ | ⊚ | ⊚ |
| 2-115 | $Nb_2O_5$ | 7.5 | 0.2 | 2.30-i0.01 | ⊚ | ⊚ | ⊚ | ⊚ |
| 2-116 | $Nb_2O_5$ | 10 | 0.2 | 2.32-i0.02 | ○ | ⊚ | ⊚ | ⊚ |
| 2-117 | $Nb_2O_5$ | 20 | 0.2 | 2.34-i0.03 | ○ | ⊚ | ⊚ | ⊚ |
| 2-118 | $Nb_2O_5$ | 30 | 0.2 | 2.37-i0.04 | ○ | ⊚ | ⊚ | ⊚ |
| 2-119 | $Nb_2O_5$ | 40 | 0.2 | 2.39-i0.05 | Δ | ○ | ⊚ | ○ |
| 2-120 | $Nb_2O_5$ | 7.5 | 0.1 | 2.36-i0.01 | ⊚ | ○ | ⊚ | ⊚ |
| 2-121 | $Nb_2O_5$ | 7.5 | 0.15 | 2.33-i0.01 | ⊚ | ⊚ | ⊚ | ⊚ |
| 2-122 | $Nb_2O_5$ | 7.5 | 0.3 | 2.23-i0.01 | ○ | ⊚ | ⊚ | ⊚ |
| 2-123 | $Nb_2O_5$ | 7.5 | 0.4 | 2.14-i0.01 | Δ | ○ | ○ | ○ |

TABLE 3-continued

| Disc No. | D | x | y | Optical constant n-ik | Signal quality | Reproduction durability | Signal storage stability | Comprehensive evaluation |
|---|---|---|---|---|---|---|---|---|
| 2-124 | $Nb_2O_5$ | 40 | 0.4 | 2.25-i0.05 | Δ | ○ | ○ | ○ |
| 2-001 | — | 0 | 0.2 | 2.28-i0.01 | ◉ | X | Δ | X |

As shown in Table 3, all the information recording media (Disc Nos. 2-101 to 2-124) in this example resulted in significantly improved reproduction durability and signal storage stability, compared to Disc No. 2-001 that was a conventional example. The signal quality was evaluated as Δ for Disc Nos. 2-107, 2-112, 2-119, 2-123 and 2-124. This is probably because the refractive index n of less than 2.15 or the extinction coefficient k of 0.05 or more caused a decrease in the contrast (reflectance ratio) between the reflectance when the recording film was in the crystalline phase and the reflectance when it was in the amorphous phase, which led to a decrease in the modulation degree. These results demonstrated that the refractive index of at least 2.15 and the extinction coefficient of not more than 0.04 were preferable for the mixed dielectric film at a wavelength of about 405 nm (wavelength of 400 nm to 410 nm). It is considered from the results shown in Table 3 that such optical properties are made easier to achieve by setting the content of D in the mixed dielectric film to not more than 30 mol %, and are made further easier to achieve by setting the value of y to not more than 0.3, though they differ from the kind of D contained in the mixed dielectric film to some extent. All the samples of Disc Nos. 2-107, 2-112, 2-119, 2-123 and 2-124 were evaluated as ○ in the comprehensive evaluation, as shown Table 3, and were practically usable.

As another example, a mixed dielectric material expressed by $\{(ZnS)_{1-y} (SiO_2)_y\}_{100-x} (D)_x$ (mol %) was used for the mixed dielectric film that was the second dielectric film 116. Samples were produced using materials in which (x, y) was set to (7.5, 0.2) and D was $TiO_2$, $Nb_2O_5$, $Ta_2O_5$, $CeO_2$, $(TiO_2)_{0.5} (Nb_2O_5)_{0.5}$, $(TiO_2)_{0.5} (Ta_2O_5)_{0.5}$ and $(TiO_2)_{0.5} (CeO_2)_{0.5}$. The respective discs of these samples were numbered from 2-125 to 2-131. Samples were further produced using materials in which (x, y) was set to (20, 0.2) and D was $TiO_2$, $Nb_2O_5$, $Ta_2O_5$, $CeO_2$, $(TiO_2)_{0.5} (Nb_2O_5)_{0.5}$, $(TiO_2)_{0.5} (Ta_2O_5)_{0.5}$ and $(TiO_2)_{0.5} (CeO_2)_{0.5}$. The respective discs of these samples were numbered from 2-132 to 2-138.

Both kinds of the samples in which the second dielectric film 116 was formed by sputtering using one sputtering target that contained ZnS, $SiO_2$ and at least one of $TiO_2$, $Nb_2O_5$, $Ta_2O_5$ and $CeO_2$, as in the third method of the Example 1, and the samples in which the second dielectric film 116 was formed by simultaneous sputtering of a sputtering target that contained ZnS and $SiO_2$, and a sputtering target that contained at least one of $TiO_2$, $Nb_2O_5$, $Ta_2O_5$ and $CeO_2$, using two RF cathodes, as in the fourth method of Example 1, were prepared for each of the Disc Nos. 2-125 to 2-138.

The signal quality, the reproduction durability and the signal storage stability of the second information layer 14 were evaluated for each sample thus produced in the same manner as in the aforementioned evaluation method. Table 4 shows the results. The evaluation criteria for ◉, ○, Δ, and x in each of the evaluation items were the same as described above. Although the results shown in Table 4 were obtained for the samples produced by the above-mentioned fourth method, the same results were obtained also for the samples produced by the above-mentioned third method, when the same evaluations were conducted.

TABLE 4

| Disc No. | D | x | y | Optical constant n-ik | Signal quality | Reproduction durability | Signal storage stability | Comprehensive evaluation |
|---|---|---|---|---|---|---|---|---|
| 2-125 | $TiO_2$ | 7.5 | 0.2 | 2.32-i0.01 | ◉ | ◉ | ◉ | ◉ |
| 2-126 | $Nb_2O_5$ | 7.5 | 0.2 | 2.30-i0.01 | ◉ | ◉ | ◉ | ◉ |
| 2-127 | $Ta_2O_5$ | 7.5 | 0.2 | 2.29-i0.01 | ◉ | ○ | ○ | ◉ |
| 2-128 | $CeO_2$ | 7.5 | 0.2 | 2.32-i0.01 | ◉ | Δ | Δ | Δ |
| 2-129 | $(TiO_2)_{0.5}(Nb_2O_5)_{0.5}$ | 7.5 | 0.2 | 2.31-i0.01 | ◉ | ◉ | ◉ | ◉ |
| 2-130 | $(TiO_2)_{0.5}(Ta_2O_5)_{0.5}$ | 7.5 | 0.2 | 2.30-i0.01 | ◉ | ○ | ○ | ◉ |
| 2-131 | $(TiO_2)_{0.5}(CeO_2)_{0.5}$ | 7.5 | 0.2 | 2.32-i0.01 | ◉ | ○ | ○ | ◉ |
| 2-132 | $TiO_2$ | 20 | 0.2 | 2.35-i0.03 | ○ | ◉ | ◉ | ◉ |
| 2-133 | $Nb_2O_5$ | 20 | 0.2 | 2.34-i0.03 | ○ | ◉ | ◉ | ◉ |
| 2-134 | $Ta_2O_5$ | 20 | 0.2 | 2.31-i0.05 | Δ | ○ | ○ | ○ |
| 2-135 | $CeO_2$ | 20 | 0.2 | 2.35-i0.03 | ○ | ○ | Δ | ○ |
| 2-136 | $(TiO_2)_{0.5}(Nb_2O_5)_{0.5}$ | 20 | 0.2 | 2.35-i0.03 | ○ | ◉ | ◉ | ◉ |
| 2-137 | $(TiO_2)_{0.5}(Ta_2O_5)_{0.5}$ | 20 | 0.2 | 2.33-i0.04 | ○ | ○ | ○ | ○ |
| 2-138 | $(TiO_2)_{0.5}(CeO_2)_{0.5}$ | 20 | 0.2 | 2.35-i0.03 | ○ | ○ | ○ | ○ |
| 2-001 | — | 0 | 0.2 | 2.28-i0.01 | ◉ | X | Δ | X |

As shown in Table 4, all the information recording media (Disc Nos. 2-125 to 2-138) in this example resulted in significantly improved reproduction durability and signal storage stability, compared to Disc No. 2-001 that was a conventional example. In the evaluations of the reproduction durability and the signal storage stability, a more significant improvement was shown in dielectrics that contain $TiO_2$ and/or $Nb_2O_5$ as D than in dielectrics that contain $Ta_2O_5$ and $CeO_2$ as D, when the content of D was the same. This is probably because the thermal conductivity of $TiO_2$ and $Nb_2O_5$ is higher than that of $Ta_2O_5$ and $CeO_2$, and thus heat stored in the recording film can be dissipated more efficiently. Accordingly, at least one selected from $TiO_2$ and $Nb_2O_5$ was found to be preferable as D. Additionally, all the samples containing $Ta_2O_5$ or $CeO_2$ as D were evaluated as Δ or ○, as shown in the comprehensive evaluation, and were practically usable.

As described above, according to the configuration of the present invention, information recording media having superior properties to conventional information recording media were obtained.

Example 3

In Example 3, another example of the information recording medium 1 shown in FIG. 1 was produced. In this example, the mixed dielectric film in the present invention was used for the second dielectric layer 106 of the first information layer 12 in the information recording medium shown in Example 1. The thickness of the second dielectric film 106 was determined by calculation based on the matrix method. Specifically, it was determined so that the reflectance of the first information layer 12 was 20% to 25% without the second information layer 14 and the third information layer 16 in the state where the recording film 104 was in the crystalline phase, with respect to a laser beam at 405 nm.

In this example, a mixed dielectric material expressed by $\{(ZnS)_{1-y}(SiO_2)_y\}_{100-x}(D)_x$ (mol %) was used for the mixed dielectric film that was the second dielectric film 106. Samples were produced using materials in which D was $TiO_2$, and (x, y) was set to (2.5, 0.2), (5, 0.2), (7.5, 0.2), (10, 0.2) and (20, 0.2). The respective discs of these samples were numbered from 3-101 to 3-105. Samples were further produced using materials in which D was $Nb_2O_5$, and (x, y) was set to (2.5, 0.2), (5, 0.2), (7.5, 0.2), (10, 0.2) and (20, 0.2). The respective discs of these samples were numbered from 3-106 to 3-110. A sample was further produced using a material in which D was $Ta_2O_5$, and (x, y) was set to (7.5, 0.2). The disc of this sample was numbered as 3-111. A sample was further produced using a material in which D was $CeO_2$, and (x, y) was set to (7.5, 0.2). The disc of this sample was numbered as 3-112. A sample was further produced using a material in which D was $(TiO_2)_{0.5}(Nb_2O_5)_{0.5}$, and (x, y) was set to (7.5, 0.2). The disc of this sample was numbered as 3-113.

Both kinds of the samples in which the second dielectric film 106 was formed by sputtering using one sputtering target that contained ZnS, $SiO_2$ and at least one of $TiO_2$, $Nb_2O_5$, $Ta_2O_5$ and $CeO_2$, as in the third method of Example 1, and the samples in which the second dielectric film 106 was formed by simultaneous sputtering of a sputtering target that contained ZnS and $SiO_2$ and a sputtering target that contains at least one of $TiO_2$, $Nb_2O_5$, $Ta_2O_5$ and $CeO_2$, using two RF cathodes, as in the fourth method of Example 1, were prepared for each of the Disc Nos. 3-101 to 3-113.

As a comparative sample, a conventional information recording medium (Disc No. 3-001) also was produced using $(ZnS)_{80}(SiO_2)_{20}$ (mol %) for the second dielectric film 106 of the information recording medium with the above-mentioned configuration.

In this example, $\{(ZnS)_{0.8}(SiO_2)_{0.2}\}_{92.5}(TiO_2)_{7.5}$ (mol %) that was the mixed dielectric film in the present invention was used for the second dielectric film 116 of the second information layer 14. The thickness of the second dielectric film 116 was determined by calculation based on the matrix method. Specifically, it was determined in the same manner as in Example 1 so that the reflectance and the transmittance (at the substrate mirror surface) of the second information layer 14, respectively, were 4% to 6% and 45% to 52% without the third information layer 16 in the state where the recording film 114 was in the crystalline phase, with respect to a laser beam at 405 nm.

The second dielectric film 116 was formed by sputtering using one sputtering target that contains ZnS, $SiO_2$ and $TiO_2$.

In this example, $\{(ZnS)_{0.8}(SiO_2)_{0.2}\}_{92.5}(TiO_2)_{7.5}$ (mol %) that was the mixed dielectric film in the present invention was used for the second dielectric film 126 of the third information layer 16. The thickness of the second dielectric film 126 was determined by calculation based on the matrix method. Specifically, it was determined in the same manner as in Example 1 so that the reflectance and the transmittance (at the substrate mirror surface) of the third information layer 16, respectively, were 1.5% to 4% and 55% to 60% in the state where the recording film 124 was in the crystalline phase, with respect to a laser beam at 405 nm.

The second dielectric film 126 was formed by sputtering using one sputtering target that contains ZnS, $SiO_2$ and $TiO_2$.

The film materials and configurations of other information layers, and the production processes thereof were the same as in Example 1.

The signal quality, the reproduction durability and the signal storage stability of the first information layer 12 were evaluated for each sample thus produced according to the evaluation method shown in Example 1. Table 5 shows the results. The evaluation criteria for ⊚, ○, Δ, and x in each of the evaluation items were the same as in Example 1. Although the results shown in Table 5 were obtained for the samples produced by the above-mentioned fourth method, the same results were obtained also for the samples produced by the above-mentioned third method, when the same evaluations were conducted.

TABLE 5

| Disc No. | D | x | y | Optical constant n-ik | Signal quality | Reproduction durability | Signal storage stability | Comprehensive evaluation |
|---|---|---|---|---|---|---|---|---|
| 3-101 | $TiO_2$ | 2.5 | 0.2 | 2.29-i0.01 | ○ | ○ | ○ | ⊚ |
| 3-102 | $TiO_2$ | 5 | 0.2 | 2.31-i0.01 | ⊚ | ⊚ | ⊚ | ⊚ |
| 3-103 | $TiO_2$ | 7.5 | 0.2 | 2.32-i0.01 | ⊚ | ⊚ | ⊚ | ⊚ |
| 3-104 | $TiO_2$ | 10 | 0.2 | 2.33-i0.02 | ⊚ | ⊚ | ⊚ | ⊚ |
| 3-105 | $TiO_2$ | 20 | 0.2 | 2.35-i0.03 | ○ | ⊚ | ⊚ | ⊚ |
| 3-106 | $Nb_2O_5$ | 2.5 | 0.2 | 2.28-i0.01 | ○ | ○ | ○ | ⊚ |
| 3-107 | $Nb_2O_5$ | 5 | 0.2 | 2.29-i0.01 | ○ | ⊚ | ⊚ | ⊚ |
| 3-108 | $Nb_2O_5$ | 7.5 | 0.2 | 2.30-i0.01 | ⊚ | ⊚ | ⊚ | ⊚ |
| 3-109 | $Nb_2O_5$ | 10 | 0.2 | 2.32-i0.02 | ⊚ | ⊚ | ⊚ | ⊚ |
| 3-110 | $Nb_2O_5$ | 20 | 0.2 | 2.34-i0.03 | ○ | ⊚ | ⊚ | ⊚ |
| 3-111 | $Ta_2O_5$ | 7.5 | 0.2 | 2.29-i0.01 | ○ | ○ | ○ | ⊚ |
| 3-112 | $CeO_2$ | 7.5 | 0.2 | 2.32-i0.01 | ⊚ | Δ | ○ | ○ |
| 3-113 | $(TiO_2)_{0.5}(Nb_2O_5)_{0.5}$ | 7.5 | 0.2 | 2.31-i0.01 | ⊚ | ⊚ | ⊚ | ⊚ |
| 3-001 | — | 0 | 0.2 | 2.28-i0.01 | ○ | Δ | Δ | Δ |

As shown in Table 5, all the information recording media (Disc Nos. 3-101 to 3-113) in this example resulted in significantly improved reproduction durability and signal storage stability, compared to Disc No. 3-001 that was a conventional example. Particularly with regard to the first information layer, the signal storage stability was remarkably improved compared to the conventional example, and all the samples were excellent and practically usable, as shown in Table 5.

As described above, according to the configuration of the present invention, information recording media having superior properties to conventional information recording media were obtained.

Example 4

In Example 4, an example of the information recording medium 2 shown in FIG. 2 was produced. In this example, an information recording medium having four information layers (N=4) is described. The method for producing the information recording medium of this example was as follows.

First, a polycarbonate substrate formed with a guide groove (with a depth of 20 nm and a track pitch of 0.32 μm) was prepared as the substrate 11. An Ag—Pd—Cu (containing at least 96 wt % of Ag) film with a thickness of 100 nm to serve as the reflective film 101, a $(Bi_2O_3)_{40}$ $(TiO_2)_{60}$ (mol %) film with a thickness of 7 nm to serve as the first dielectric film 102, a $(ZrO_2)_{35}(SiO_2)_{35}(Cr_2O_3)30$ (mol %) film with a thickness of 5 nm to serve as the first interface film 103, a $Ge_{49.0}Sb_{1.0}In_{3.0}Te_{51.0}$ (atom %) film with a thickness of 10 nm to serve as the recording film 104, a $(ZrO_2)_{35}(SiO_2)_{35}(Cr_2O_3)_{30}$ (mol %) film with a thickness of 5 nm to serve as the second interface film 105 and a $(ZnS)_{80}(SiO_2)_{20}$ (mol %) film to serve as the second dielectric film 106 were sequentially formed on the substrate 11 by sputtering. The thickness of the second dielectric film 106 was determined by calculation based on the matrix method. Specifically, it was determined so that the reflectance of the first information layer 21 was 25% to 35% without the second to fourth information layers in the state where the recording film 104 was in the crystalline phase, with respect to a laser beam at 405 nm.

Subsequently, the optical separation layer 22 provided with a guide groove was formed on the first information layer 21, and the second information layer 23 was formed on the optical separation layer 22. A $(Bi_2O_3)_{40}(TiO_2)_{60}$ (mol %) film with a thickness of 18 nm to serve as a transmittance adjusting film, an Ag—Pd—Cu (containing at least 96 wt % of Ag) film with a thickness of 8 nm to serve as a reflective film, an $Al_2O_3$ film with a thickness of 7 nm to serve as a first dielectric film, a $(ZrO_2)_{35}(SiO_2)_{35}(Cr_2O_3)_{30}$ (mol %) film with a thickness of 5 nm to serve as a first interface film, a $Ge_{46.3}Sb_{1.0}In_{2.0}Te_{50.7}$ (atom %) film with a thickness of 6.5 nm to serve as a recording film, a $(ZrO_2)_{50}(Cr_2O_3)_{50}$ (mol %) film with a thickness of 5 nm to serve as a second interface film and a $\{(ZnS)_{0.8}(SiO_2)_{0.2}\}_{92.5}(TiO_2)7.5$ (mol %) film that was the mixed dielectric film in the present invention to serve as the second dielectric film 206 were sequentially formed as the second information layer 23 by sputtering.

The thickness of the second dielectric film in the second information layer 23 was determined by calculation based on the matrix method. Specifically, it was determined so that the reflectance and the transmittance (at the substrate mirror surface) of the second information layer 23, respectively, were 6% to 9% and 51% to 58% without the third and fourth information layers in the state where the recording film of the second information layer 23 was in the crystalline phase, with respect to a laser beam at 405 nm.

Subsequently, the optical separation layer 24 provided with a guide groove was formed on the second information layer 23, and the third information layer was formed on the optical separation layer 24. In this example, the third information layer corresponds to the n-th information layer 26 in Embodiment 2, and thus is hereinafter referred to as the third information layer 26. A $(Bi_2O_3)_{40}(TiO_2)_{60}$ (mol %) film with a thickness of 18 nm to serve as the transmittance adjusting film 200, an Ag—Pd—Cu (containing at least 96 wt % of Ag) film with a thickness of 6.5 nm to serve as the reflective film 201, an $Al_2O_3$ film with a thickness of 6 nm to serve as the first dielectric film 202, a $(ZrO_2)_{35}$ $(SiO_2)_{35}$ $(Cr_2O_3)_{30}$ (mol %) film with a thickness of to serve as the first interface film 203, a $Ge_{46.3}Sb_{1.0}In_{2.0}Te_{50.7}$ (atom %) film with a thickness of 5.8 nm to serve as the recording film 204, a $(ZrO_2)_{50}$ $(Cr_2O_3)_{50}$ (mol %) film with a thickness of 5 nm to serve as the second interface film 205 and a $\{(ZnS)_{0.8}(SiO_2)_{0.2}\}_{92.5}(TiO_2)_{7.5}$(mol %) film that was the mixed dielectric film in the present invention to serve as the second dielectric film 206 were sequentially formed as the third information layer 26 by sputtering.

The thickness of the second dielectric film 206 was determined by calculation based on the matrix method. Specifically, it was determined so that the reflectance and the transmittance (at the substrate mirror surface) of the third information layer 26, respectively, were 3% to 5% and 56% to 63% without the fourth information layer 28 in the state where the recording film 204 of the third information layer 26 was in the crystalline phase, with respect to a laser beam at 405 nm.

Subsequently, the optical separation layer 27 provided with a guide groove was formed on the third information layer 26, and the fourth information layer 28 was formed on the optical separation layer 27. The fourth information layer 28 has the same film structure as the third information layer 26. A $(Bi_2O_3)_{40}$ $(TiO_2)_{60}$ (mol %) film with a thickness of 17 nm to serve as a transmittance adjusting film, an Ag—Pd—Cu (containing at least 96 wt % of Ag) film with a thickness of 5.5 nm to serve as a reflective film, an $Al_2O_3$ film with a thickness of 6 nm to serve as a first dielectric film, a $(ZrO_2)_{35}$ $(SiO_2)_{35}$ $(Cr_2O_3)_{30}$ (mol %) film with a thickness of 5 nm to serve as a first interface film, a $Ge_{46.3}Sb_{1.5}In_{1.5}Te_{50.7}$ (atom %) film with a thickness of 5.5 nm to serve as a recording film, a $(ZrO_2)_{50}$ $(Cr_2O_3)_{50}$ (mol %) film with a thickness of 5 nm to serve as a second interface film, and the mixed dielectric film in the present invention to serve as a second dielectric film were sequentially formed by sputtering.

The thickness of the second dielectric film in the fourth information layer 28 was determined by calculation based on the matrix method. Specifically, it was determined so that the reflectance and the transmittance (at the substrate mirror surface) of the fourth information layer 28, respectively, were 1% to 3% and 58% to 65% in the state where the recording film was in the crystalline phase, with respect to a laser beam at 405 nm.

Thereafter, an ultraviolet curable resin was applied onto the second dielectric layer of the fourth information layer 28 and spin coating was performed. After that, the resin was cured with ultraviolet rays to form the cover layer 17. Thus, the information recording medium of this example was produced. Finally, an initialization process was performed for crystallizing the entire surface of the recording film of the first to fourth information layers by irradiation with a laser beam.

In this example, a mixed dielectric material expressed by $\{(ZnS)_{1-y}(SiO_2)_y\}_{100-x}(D)_x$ (mol %) was used for the mixed dielectric film that was the second dielectric film of the fourth information layer 28. Samples were produced using materials in which D was $TiO_2$, and (x, y) was set to (2.5, 0.2), (5, 0.2), (7.5, 0.2), (10, 0.2) and (20, 0.2). The respective discs of these samples were numbered from 4-101 to 4-105. Samples were further produced using materials in which D was $Nb_2O_5$, and (x, y) was set to (2.5, 0.2), (5, 0.2), (7.5, 0.2), (10, 0.2) and (20, 0.2). The respective discs of these samples were numbered from 4-106 to 4-110. A sample was further produced using a material in which D was $Ta_2O_5$, and (x, y) was set to (7.5, 0.2). The disc of this sample was numbered as 4-111. A sample was further produced using a material in which D was $CeO_2$, and (x, y) was set to (7.5, 0.2). The disc of this sample was numbered as 4-112. A sample was further produced using a material in which D was $(TiO_2)_{0.5} (Nb_2O_5)_{0.5}$, and (x, y) was set to (7.5, 0.2). The disc of this sample was numbered as 4-113.

Both kinds of the samples in which the second dielectric film of the fourth information layer 28 was formed by sputtering using one sputtering target that contained ZnS, $SiO_2$ and at least one of $TiO_2$, $Nb_2O_5$, $Ta_2O_5$ and $CeO_2$, as in the third method of Example 1, and the samples in which the second dielectric film of the fourth information layer 28 was formed by simultaneous sputtering of a sputtering target that contained ZnS and $SiO_2$, and a sputtering target that contains at least one of $TiO_2$, $Nb_2O_5$, $Ta_2O_5$ and $CeO_2$, using two RF cathodes, as in the fourth method of Example 1, were prepared for each of the Disc Nos. 4-101 to 4-113.

As a comparative sample, a conventional information recording medium (Disc No. 4-001) also was produced using a $(ZnS)_{80} (SiO_2)_{20}$ (mol %) film for the second dielectric film of the fourth information layer 28 in the information recording medium with the above-mentioned configuration.

Each sample of the information recording medium produced as described above was evaluated as follows.

<Signal Quality Evaluation>

The signal quality of each sample was evaluated, using the recording/reproducing apparatus 3 shown in FIG. 3. The wavelength of the laser beam was 405 nm and the numerical aperture NA of the object lens was 0.85. Information was recorded on a groove (a groove surface located nearer to the laser incident side). The linear velocity for recording and reproduction was set to 7.36 m/s, and the periodic clock therefor was set to 66 MHz (where the shortest mark length (2T) was 0.111 μm from the relationship between the linear velocity and the periodic clock, which was equivalent to 2× speed recording of 33.4 GB per information layer). The reproduction power was set to 1.8 mW for the first and second information layers, 1.6 mW for the third information layer and 1.3 mW for the fourth information layer. An unmodulated laser beam was used as the reproducing beam.

The signal quality was evaluated by recording a 8T mark 10 times and measuring the modulation degree thereof. The modulation degree of the 8T mark of 45% or more was evaluated as ◎, that of 40% or more but less than 45% was evaluated as ○, that of 35% or more but less than 40% was evaluated as Δ, and that of less than 35% was evaluated as x.

<Reproduction Durability>

The apparatus used for recording/reproduction, the linear velocity for recording and reproduction and the periodic clock were the same as those in the signal quality evaluation. The reproduction durability was evaluated by recording random signals of 2T to 9T and counting the number of reproduction times in which the SER exceeds the reference value of $5.0 \times 10^{-3}$. The reproduction power was set to 1.8 mW for the third information layer and 1.4 mW for the fourth information layer. An unmodulated laser beam was used as the reproducing beam. The number of reproduction times of one million or more was evaluated as ◎, that of half a million or more but less than one million was evaluated as ○, that of one hundred thousand or more but less than half a million was evaluated as Δ, and that of less than one hundred thousand was evaluated as x. The random marks subjected to the evaluation were recorded using the N-1 modulation method and DOW10 recording by setting the write power, the erase power, the bottom/cooling power to values that allow the best SER in each sample.

<Signal Storage Stability Evaluation>

The apparatus used for recording/reproduction, the linear velocity for recording and reproduction and the periodic clock were the same as those in the signal quality evaluation. The signal storage stability was evaluated by recording random signals of 2T to 9T, conducting an accelerated test for the information recording medium in a thermostatic bath at 80° C. and 20% RH for 50 hours, and determining the degradation of the SER from before the accelerated test. The degradation of $+1.0 \times 10^{-4}$ or less was evaluated as ◎, that of more than $+1.0 \times 10^{-4}$ but not more than $+5.0 \times 10^{-4}$ was evaluated as ○, that of more than $+5.0 \times 10^{-4}$ but not more than $+1.0 \times 10^{-3}$ was evaluated as Δ, that of more than $+1.0 \times 10^{-3}$ was evaluated as x. The random marks subjected to the evaluation were recorded using the N-1 modulation method and DOW10 (Direct Overwrite 10) recording by setting the write power, the erase power, the bottom/cooling power to values that allow the best SER in each information recording medium, in the same manner as in the reproduction durability evaluation.

The fourth information layer 28 of each sample in this example was evaluated by the above-mentioned evaluation method. Table 6 shows the results. In Table 6, a comprehensive evaluation was made based on the signal quality, the reproduction durability and the signal storage stability. In the comprehensive evaluation, x indicates that at least one item was evaluated as x, Δ indicates that no item was evaluated as x and at least two items were evaluated as Δ, ○ indicates that no item was evaluated as x and not more than one item was evaluated as Δ, or all the items were evaluated as ○, and ◎ indicates that no item was evaluated as Δ or x and at least one item was evaluated as ◎. Although the results shown in Table 6 were obtained for the samples produced by the above-mentioned fourth method, the same results were obtained also for the samples produced by the above-mentioned third method, when the same evaluations were conducted.

The information recording media evaluated as x in the comprehensive evaluation were not practically usable. However, the information recording media evaluated as Δ, ○, or ◎ were practically usable. Among the practically usable information recording media, those evaluated as ○ were superior to those evaluated as Δ, and those evaluated as ◎ were further superior thereto.

TABLE 6

| Disc No. | D | x | y | Optical constant n-ik | Signal quality | Reproduction durability | Signal storage stability | Comprehensive evaluation |
|---|---|---|---|---|---|---|---|---|
| 4-101 | $TiO_2$ | 2.5 | 0.2 | 2.29-i0.01 | ◎ | ○ | ○ | ◎ |
| 4-102 | $TiO_2$ | 5 | 0.2 | 2.31-i0.01 | ◎ | ◎ | ◎ | ◎ |
| 4-103 | $TiO_2$ | 7.5 | 0.2 | 2.32-i0.01 | ◎ | ◎ | ◎ | ◎ |
| 4-104 | $TiO_2$ | 10 | 0.2 | 2.33-i0.02 | ◎ | ◎ | ◎ | ◎ |
| 4-105 | $TiO_2$ | 20 | 0.2 | 2.35-i0.03 | ○ | ◎ | ◎ | ◎ |
| 4-106 | $Nb_2O_5$ | 2.5 | 0.2 | 2.28-i0.01 | ◎ | ○ | ○ | ◎ |
| 4-107 | $Nb_2O_5$ | 5 | 0.2 | 2.29-i0.01 | ◎ | ◎ | ◎ | ◎ |
| 4-108 | $Nb_2O_5$ | 7.5 | 0.2 | 2.30-i0.01 | ◎ | ◎ | ◎ | ◎ |

TABLE 6-continued

| Disc No. | D | x | y | Optical constant n-ik | Signal quality | Reproduction durability | Signal storage stability | Comprehensive evaluation |
|---|---|---|---|---|---|---|---|---|
| 4-109 | $Nb_2O_5$ | 10 | 0.2 | 2.32-i0.02 | ◎ | ◎ | ◎ | ◎ |
| 4-110 | $Nb_2O_5$ | 20 | 0.2 | 2.34-i0.03 | ○ | ◎ | ◎ | ◎ |
| 4-111 | $Ta_2O_5$ | 7.5 | 0.2 | 2.29-i0.01 | ◎ | ○ | ○ | ◎ |
| 4-112 | $CeO_2$ | 7.5 | 0.2 | 2.32-i0.01 | ◎ | Δ | Δ | Δ |
| 4-113 | $(TiO_2)_{0.5}(Nb_2O_5)_{0.5}$ | 7.5 | 0.2 | 2.31-i0.01 | ◎ | ◎ | ◎ | ◎ |
| 4-001 | — | 0 | 0.2 | 2.28-i0.01 | ◎ | X | Δ | X |

As shown in Table 6, all the information recording media (Disc Nos. 4-101 to 4-113) in this example resulted in significantly improved signal quality, reproduction durability and signal storage stability, compared to Disc No. 4-001 that was a conventional example. All the sample were practically usable as shown in the comprehensive evaluation.

As described above, according to the configuration of the present invention, information recording media having superior properties to conventional information recording media were obtained.

Example 5

In Example 5, another example of the information recording medium 2 shown in FIG. 2 was produced. In this example, the mixed dielectric film in the present invention was used for the second dielectric layer 206 of the third information layer 26 in the information recording medium shown in Example 4. The thickness of the second dielectric layer 206 of the third information layer 26 was determined in the same manner as in Example 4 so that the reflectance and the transmittance (at the substrate mirror surface) of the third information layer 26, respectively, were 3% to 5% and 56% to 63% without the fourth information layer in the state where the recording film 204 of the third information layer 26 was in the crystalline phase, with respect to a laser beam at 405 nm.

In this example, a mixed dielectric material expressed by $\{(ZnS)_{1-y}(SiO_2)_y\}_{100-x}(D)_x$ (mol %) was used for the mixed dielectric film that was the second dielectric film 206 of the third information layer 26. Samples were produced using materials in which D was $TiO_2$, and (x, y) was set to (2.5, 0.2), (5, 0.2), (7.5, 0.2), (10, 0.2) and (20, 0.2). The respective discs of these samples were numbered from 5-101 to 5-105. Samples were further produced using materials in which D was $Nb_2O_5$, and (x, y) was set to (2.5, 0.2), (5, 0.2), (7.5, 0.2), (10, 0.2) and (20, 0.2). The respective discs of these samples were numbered from 5-106 to 5-110. A sample was further produced using a material in which D was $Ta_2O_5$, and (x, y) was set to (7.5, 0.2). The disc of this sample was numbered as 5-111. A sample was further produced using a material in which D was $CeO_2$, and (x, y) was set to (7.5, 0.2). The disc of this sample was numbered as 5-112. A sample was further produced using a material in which D was $(TiO_2)_{0.5}(Nb_2O_5)_{0.5}$, and (x, y) was set to (7.5, 0.2). The disc of this sample was numbered as 5-113.

Both kinds of the samples in which the second dielectric film 206 was formed by sputtering using one sputtering target that contained ZnS, $SiO_2$ and at least one of $TiO_2$, $Nb_2O_5$, $Ta_2O_5$ and $CeO_2$, as in the third method of Example 1, and the samples in which the second dielectric film 206 was formed by simultaneous sputtering of a sputtering target that contained ZnS and $SiO_2$ and a sputtering target that contains at least one of $TiO_2$, $Nb_2O_5$, $Ta_2O_5$ and $CeO_2$, using two RF cathodes, as in the fourth method of Example 1, were prepared for each of the Disc Nos. 5-101 to 5-113.

As a comparative sample, an information recording medium (Disc No. 5-001) also was produced using a $(ZnS)_{80}(SiO_2)_{20}$ (mol %) film for the second dielectric film 206 of the information recording medium with the above-mentioned configuration.

In this example, a $\{(ZnS)_{0.8}(SiO_2)_{0.2}\}_{92.5}(TiO_2)_{7.5}$ (mol %) film that was the mixed dielectric film in the present invention was used for the second dielectric film of the forth information layer 28. The thickness of the second dielectric film was determined by calculation based on the matrix method. Specifically, it was determined in the same manner as in Example 4 so that the reflectance and the transmittance (at the substrate mirror surface) of the fourth information layer 28, respectively, were 1% to 3% and 58% to 65% in the state where the recording film of the fourth information layer 28 was in the crystalline phase, with respect to a laser beam at 405 nm.

The film materials and configurations of other information layers, and the production processes thereof were the same as in Example 4.

The signal quality, the reproduction durability and the signal storage stability of the third information layer 26 were evaluated for each sample thus produced according to the evaluation method shown in Example 4. Table 7 shows the results. The evaluation criteria for ◎, ○, Δ, and x in each of the evaluation items were the same as in Example 4. Although the results shown in Table 7 were obtained for the samples produced by the above-mentioned fourth method, the same results were obtained also for the samples produced by the above-mentioned third method, when the same evaluations were conducted.

TABLE 7

| Disc No. | D | x | y | Optical constant n-ik | Signal quality | Reproduction durability | Signal storage stability | Comprehensive evaluation |
|---|---|---|---|---|---|---|---|---|
| 5-101 | $TiO_2$ | 2.5 | 0.2 | 2.29-i0.01 | ○ | ○ | ○ | ○ |
| 5-102 | $TiO_2$ | 5 | 0.2 | 2.31-i0.01 | ◎ | ◎ | ◎ | ◎ |
| 5-103 | $TiO_2$ | 7.5 | 0.2 | 2.32-i0.01 | ◎ | ◎ | ◎ | ◎ |
| 5-104 | $TiO_2$ | 10 | 0.2 | 2.33-i0.02 | ○ | ◎ | ◎ | ◎ |
| 5-105 | $TiO_2$ | 20 | 0.2 | 2.35-i0.03 | ○ | ◎ | ◎ | ◎ |
| 5-106 | $Nb_2O_5$ | 2.5 | 0.2 | 2.28-i0.01 | ○ | ○ | ○ | ○ |

TABLE 7-continued

| Disc No. | D | x | y | Optical constant n-ik | Signal quality | Reproduction durability | Signal storage stability | Comprehensive evaluation |
|---|---|---|---|---|---|---|---|---|
| 5-107 | $Nb_2O_5$ | 5 | 0.2 | 2.29-i0.01 | ○ | ◎ | ◎ | ◎ |
| 5-108 | $Nb_2O_5$ | 7.5 | 0.2 | 2.30-i0.01 | ◎ | ◎ | ◎ | ◎ |
| 5-109 | $Nb_2O_5$ | 10 | 0.2 | 2.32-i0.02 | ○ | ◎ | ◎ | ◎ |
| 5-110 | $Nb_2O_5$ | 20 | 0.2 | 2.34-i0.03 | ○ | ◎ | ◎ | ◎ |
| 5-111 | $Ta_2O_5$ | 7.5 | 0.2 | 2.29-i0.01 | ○ | ○ | ○ | ○ |
| 5-112 | $CeO_2$ | 7.5 | 0.2 | 2.32-i0.01 | ◎ | Δ | Δ | Δ |
| 5-113 | $(TiO_2)_{0.5}(Nb_2O_5)_{0.5}$ | 7.5 | 0.2 | 2.31-i0.01 | ◎ | ◎ | ◎ | ◎ |
| 5-001 | — | 0 | 0.2 | 2.28-i0.01 | ○ | X | Δ | X |

As shown in Table 7, all the information recording media (Disc Nos. 5-101 to 5-113) in this example resulted in significantly improved signal quality, reproduction durability and signal storage stability, compared to Disc No. 5-001 that was a conventional example. All the samples were practically usable as shown in the comprehensive evaluation.

As described above, according to the configuration of the present invention, information recording media having superior properties to conventional information recording media were obtained.

It should be understood that, although the embodiments of the present invention have been described referring to the examples thereof, the present invention is not limited to the above-mentioned embodiments, as described above, and may be applied to other embodiments based on the technical idea of the present invention. In the case of a multilayered information recording medium having a plurality of information layers as shown in Embodiments 1 and 2, for example, any one of the information layers may include an information layer of write-once type or read-only type.

INDUSTRIAL APPLICABILITY

The information recording medium of the present invention and the method for producing the same are useful for Blu-ray Discs, and DVDs (Digital Versatile Discs) such as DVD-RAM, for example, as a high capacity optical information recording medium having an excellent mixed dielectric material. They are applicable to discs with a small diameter, for example, of 6 cm and 8 cm as well. Further, the information recording medium and the production method thereof are useful as a still higher capacity information recording medium on which high density recording can be performed using near-field light in an optical system provided with an SIL (Solid Immersion Lens). Furthermore, they also are useful as an electrical information recording medium or an electrical switching element. Both rewritable type and write-once type are applicable in all the use cases.

The invention claimed is:

1. An information recording medium comprising a recording film, the information recording medium allowing information to be recorded and reproduced on and from the information recording medium by irradiation of the recording film with a laser beam, wherein
    the information recording medium further comprises a mixed dielectric film disposed on the laser beam incident side with respect to the recording film, and
    the mixed dielectric film contains a mixed dielectric material consisting of Zn sulfide, Si oxide and an oxide X (where the oxide X is an oxide of at least one element selected from Ti, Nb, Ta and Ce).

2. The information recording medium according to claim 1, wherein
    the mixed dielectric film contains 30 mol % or less of the oxide X.

3. The information recording medium according to claim 2, wherein
    the mole ratio of the Si oxide with respect to the total of the Zn sulfide and the Si oxide in the mixed dielectric film is not more than 0.3.

4. The information recording medium according to claim 1, wherein
    the oxide X is at least one selected from Ti oxide and Nb oxide.

5. The information recording medium according to claim 1, wherein
    the mixed dielectric material is expressed by a formula:

$$\{(ZnS)_{1-y}(SiO_2)_y\}_{100-x}(D)_x (\text{mol }\%),$$

where x and y respectively satisfy: 0<x<100; and 0<y<1, and

D is at least one selected from $TiO_2$, $Nb_2O_5$, $Ta_2O_5$ and $CeO_2$.

6. The information recording medium according to claim 5, wherein
    in the formula, x and y respectively satisfy: 0<x≦30; and 0<y≦0.3.

7. The information recording medium according to claim 5, wherein
    the D is at least one selected from $TiO_2$ and $Nb_2O_5$.

8. The information recording medium according to claim 1, wherein
    the mixed dielectric film has a refractive index of at least 2.15 and an extinction coefficient of not more than 0.04 at a wavelength of 400 nm to 410 nm.

9. The information recording medium according to claim 1, further comprising an interface film provided between the recording film and the mixed dielectric film.

10. The information recording medium according to claim 1, wherein
    the mixed dielectric film has a thickness of 25 nm or more but not more than 100 nm.

11. The information recording medium according to claim 1, comprising:
    layers from a first information layer to an N-th information layer (where N is an integer of at least two) disposed sequentially from the opposite side of the laser beam incident side, wherein
    at least one information layer included in the layers from the first information layer to the N-th information layer comprises the mixed dielectric film and the recording film in this order from the laser beam incident side.

12. The information recording medium according to claim 11, wherein
an n-th information layer included in the layers from the first information layer to the N-th information layer comprises the mixed dielectric film and the recording film in this order from the laser beam incident side, where n is an integer that satisfies $1 < n \leq N$.

13. A method for producing an information recording medium, comprising the step of:
forming a mixed dielectric film containing a mixed dielectric material consisting of Zn sulfide, Si oxide and an oxide X (where the oxide X is an oxide of at least one element selected from Ti, Nb, Ta and Ce), wherein
the mixed dielectric film is formed by sputtering using a sputtering target that contains ZnS, $SiO_2$ and D (where D is at least one selected from $TiO_2$, $Nb_2O_5$, $Ta_2O_5$ and $CeO_2$) in the step.

14. The method for producing an information recording medium according to claim 13, wherein
the mixed dielectric film that has been formed using the sputtering target contains 30 mol % or less of the D.

15. The method for producing an information recording medium according to claim 13, wherein
the mole ratio of $SiO_2$ with respect to the total of ZnS and $SiO_2$ in the mixed dielectric film that has been formed using the sputtering target is not more than 0.3.

16. A method for producing an information recording medium, comprising the step of:
forming a mixed dielectric film containing a mixed dielectric material consisting of Zn sulfide, Si oxide and an oxide X (where the oxide X is an oxide of at least one element selected from Ti, Nb, Ta and Ce), wherein
the mixed dielectric film is formed by simultaneous sputtering of a first sputtering target and a second sputtering target using at least two cathodes in the step,
the first sputtering target is made of ZnS and $SiO_2$, and
the second sputtering target is made of D (where D is at least one selected from $TiO_2$, $Nb_2O_5$, $Ta_2O_5$ and $CeO_2$).

17. The method for producing an information recording medium according to claim 16, wherein
the first sputtering target contains 40 mol % or less of $SiO_2$.

* * * * *